(12) United States Patent
John Archibald et al.

(10) Patent No.: US 9,674,700 B2
(45) Date of Patent: Jun. 6, 2017

(54) DISTRIBUTING BIOMETRIC AUTHENTICATION BETWEEN DEVICES IN AN AD HOC NETWORK

(71) Applicant: QUALCOMM Incorporated, San Diego, CA (US)

(72) Inventors: Fitzgerald John Archibald, North York (CA); John Schneider, Williamsville, NY (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 14/532,608

(22) Filed: Nov. 4, 2014

(65) Prior Publication Data

US 2016/0127900 A1    May 5, 2016

(51) Int. Cl.
*H04W 12/06* (2009.01)
*H04L 29/06* (2006.01)
(Continued)

(52) U.S. Cl.
CPC ............ *H04W 12/06* (2013.01); *G06F 21/32* (2013.01); *H04L 63/0861* (2013.01);
(Continued)

(58) Field of Classification Search
CPC . H04L 63/0861; H04L 9/0866; H04L 9/3231; H04L 29/06809; H04L 63/0853;
(Continued)

(56) References Cited

U.S. PATENT DOCUMENTS 7,120,797 B2 * 10/2006 Wheeler ............... H04L 9/0844
380/277
7,378,939 B2 * 5/2008 Sengupta ............... H04M 1/67
340/5.53
(Continued)

OTHER PUBLICATIONS

Nandakumar K., et al., "Likelihood Ratio-Based Biometric Score Fusion," IEEE Transactions on Pattern Analysis and Machine Intelligence, Feb. 2008, vol. 30 (2), pp. 342-347.
(Continued)

*Primary Examiner* — Robert Leung
*Assistant Examiner* — Carles M De Jesus Lassala
(74) *Attorney, Agent, or Firm* — Won Tae C. Kim

(57) ABSTRACT

One feature pertains to biometric authentication of a user between devices. In one aspect, an ad hoc personal wireless network may include a primary device and one or more secondary devices using grouping policies such proximity policies and other permissions. The primary device shares a biometric authentication value of a user with the one or more secondary devices. Each secondary device may then perform additional authentication of the same user using a relatively low reliability biometric sensor such as a digital camera for facial recognition, a microphone for voice recognition or an accelerometer for gesture recognition. The secondary authentication results may be combined with the biometric authentication score/level from the primary device to form a final authentication score/level of the secondary device, which is used to authenticate the user of the secondary device for one or more transactions such as consumer purchases, secure content access, or secure control.

39 Claims, 22 Drawing Sheets

(51) Int. Cl.
*G06F 21/32* (2013.01)
*H04W 4/00* (2009.01)
*H04W 84/18* (2009.01)

(52) U.S. Cl.
CPC ......... *H04W 4/008* (2013.01); *H04L 63/0853* (2013.01); *H04W 84/18* (2013.01)

(58) Field of Classification Search
CPC .. H06L 63/0861; H04W 12/06; H04W 4/008; G06F 21/32
See application file for complete search history.

(56) References Cited

U.S. PATENT DOCUMENTS

| | | | | |
|---|---|---|---|---|
| 8,484,709 | B2* | 7/2013 | Wolfond | G06F 21/31 713/186 |
| 8,494,961 | B1 | 7/2013 | Lucas et al. | |
| 8,553,885 | B2 | 10/2013 | Little et al. | |
| 8,555,411 | B2* | 10/2013 | Hurwitz | H04L 63/104 380/265 |
| 2002/0194003 | A1* | 12/2002 | Mozer | G06F 21/32 704/270.1 |
| 2013/0324089 | A1* | 12/2013 | Kim | G06F 21/32 455/411 |
| 2014/0046664 | A1* | 2/2014 | Sarkar | H04W 12/06 704/246 |
| 2014/0134986 | A1* | 5/2014 | Yasumoto | H04W 4/003 455/414.1 |
| 2014/0137235 | A1 | 5/2014 | Horton | |
| 2015/0070134 | A1* | 3/2015 | Nagisetty | G07C 9/00007 340/5.61 |
| 2015/0128240 | A1* | 5/2015 | Richards | H04L 63/0861 726/7 |
| 2015/0278498 | A1* | 10/2015 | Hong | G06F 21/35 340/5.82 |
| 2015/0348007 | A1* | 12/2015 | Khan | G06Q 20/382 705/44 |

OTHER PUBLICATIONS

International Search Report and Written Opinion—PCT/US2015/058150—ISA/EPO—Jan. 25, 2016.

Verlinde P., et al., "Multi-Modal Identity Verification Using Expert Fusion", Information Fusion, vol. 1, No. 1, Jul. 2000 (Jul. 2000), pp. 17-33, XP055242054, ISSN : 1566-2535, DOI : 10.1016/S1566-2535(00)00002-6.

Xi K., et al., "A Fingerprint Based Bio-Cryptographic Security Protocol Designed for Client/Server Authentication in Mobile Computing Environment", Security and Communication Networks, vol. 4, No. 5, Dec. 3, 2010 (Dec. 3, 2010), pp. 487-499, XP055127297, ISSN: 1939-0114, DOI: 10.1002/sec.225.

\* cited by examiner

*Further Procedures of the Primary Device* 1800

1802 — Invite/disinvite secondary devices to/from the ad hoc network based on commonality in one or more of more of ambient noise, ambient light, location, motion and a shared communication links.

1804 — Forward one or more of permissions and policies to one or more secondary devices along with the primary authentication value, which may be a authentication value.

1806 — Detect a trigger for deauthenticating the user of the primary device and, in response, deauthenticate the user of the primary device and all secondary devices of the ad hoc network, wherein the trigger for deauthenticating the user of the primary device includes at least one of: (a) a user initiated primary device deauthentication, (b) a primary device timeout, or (c) a primary device threat indication representative of a security compromise of the primary device.

1808 — Detect a trigger for deauthenticating the user of a secondary device and, in response, send signals to the secondary device to deauthenticate the user of the secondary device, wherein the trigger for deauthenticating the user of the secondary device includes one or more of a user initiated secondary device deauthentication, a secondary device timeout, a secondary device threat indication representative of a security compromise of the secondary device, a loss of communication with the secondary device, a loss of commonality between the primary device and the secondary device and a violation of a predetermined permission or policy.

*FIG. 18*

DISTRIBUTING BIOMETRIC AUTHENTICATION BETWEEN DEVICES IN AN AD HOC NETWORK

BACKGROUND

Field

Various features relate to biometric authentication within wireless ad hoc networks such as networks composed of mobile computing devices.

Background

A wireless ad hoc network is a decentralized wireless network that does not rely on pre-existing infrastructure or central managing device such as routers. Rather, each node in the network participates in routing by forwarding data for other nodes. A wireless ad hoc personal network is a wireless ad hoc network composed of personal devices such as smartphones, tablets, smartwatches, smartglasses, etc. Such networks may have a relatively sophisticated primary device such as a smartphone or tablet along with various secondary personal devices such as smartwatches, smartglasses, smartclothing, etc., that are relatively less sophisticated and capable than the primary device.

Primary devices such as smartphones or tablets may be provisioned with embedded biometric sensors that are relatively reliable and sophisticated such as fingerprint sensors to facilitate authentication of the user of the primary device for various purposes such as consumer purchases or other financial transactions, secure content access, secure activation and control, etc. Sophisticated biometric sensors are typically not provided within secondary devices such as smartwatches, smartglasses or smartclothing because of small form factors, cost considerations, battery longevity considerations or other practical reasons. Nevertheless, secondary devices may require user authentication for various applications such as consumer purchases. For example, it may be desirable to allow a user to make modest commercial purchases merely by waving a smartwatch over a retail scanner without requiring the user to authorize and authenticate the transaction with a more cumbersome smartphone.

FIG. 1 illustrates an example of an ad hoc personal network 100 having a smartphone 102 as the primary device and a smartwatch 104 and pair of smartglasses 106 as secondary paired devices. In this example, the smartphone 102 is in communication with a cellular network via a base station 108 using wireless signals in accordance with a technology such as Long-Term Evolution (LTE.) The smartphone 102 is in communication with the smartwatch 104 and the smartglasses 106 via a local wireless transmission protocol such as Wireless Universal Serial Bus (USB) or Bluetooth™. The smartphone 102 is equipped to authenticate the user of the smartphone using fingerprint-based biometric authentication (using a fingerprint sensor, not shown.) The smartwatch 104 is equipped to authenticate the user using a less reliable motion-based biometric authentication (such as by using an accelerometer, not shown, equipped to detect a unique gesture made by the user wearing the smartwatch.) The smartglasses 106 are equipped to authenticate the user using facial image-based biometric authentication (such as by employing a digital camera, not shown), which is also generally less reliable than fingerprint authentication. FIG. 1 also illustrates an automated teller machine (ATM) 110 that the user seeks to obtain funds from using the smartwatch 104. Since the motion-based authentication provided by the smartwatch is not sufficiently reliable, the ATM would typically require the user to authenticate and authorize the transaction by using a debit card and entering a passcode into a keypad of the ATM, which can be inconvenient for the user, particularly if the passcode is hard to remember, and indeed would negate the convenience of using the smartwatch to trigger the transaction. Alternatively, the ATM might be programmed to accept the relatively unreliable gesture-based authentication of the smartwatch, which would be more convenient for the user but which might permit a thief to obtain funds using a stolen or spoofed smartwatch merely by replicating the authentication motion.

There is a need to provide convenient and reliable authentication for use with secondary devices within an ad hoc network of primary and secondary devices.

SUMMARY

A method for use by a primary device of an ad hoc network for authentication of a user includes: obtaining at least one biometric parameter representative of the user of the primary device; determining a primary authentication value representative of a degree of authentication of the user of the primary device based on the at least one biometric parameter; authenticating the user of the primary device based on the primary authentication value; and sharing the primary authentication value with a secondary device to facilitate authentication of the user (e.g., by the secondary device). The primary device and secondary device may communicate via an ad hoc wireless network.

In another aspect, a device includes: a biometric parameter detector configured to obtain at least one biometric parameter representative of the user of a primary device of an ad hoc network; a transmitter; and a processing circuit configured to determine a value representative of a degree of authentication of the user of the primary device based on the at least one biometric parameter, authenticate the user of the primary device based on the value representative of the degree of authentication, and share the value representative of the degree of authentication with a secondary device of the ad hoc network using the transmitter to facilitate authentication of the user (e.g., by the secondary device).

In yet another aspect, a method for use by a secondary device of an ad hoc network for authentication of a user includes: receiving a primary authentication value representative of a degree of authentication of a user from a primary device of the ad hoc network; and determining whether to perform a secondary authentication of the user and, if secondary authentication is to be performed, (a) obtaining at least one biometric parameter using the secondary device representative of the user of the secondary device, (b) determining a secondary authentication value representative of a degree of authentication of the user of the secondary device based on the at least one biometric parameter obtained using the secondary device, (c) combining the primary authentication value received from the primary device with the secondary authentication value to yield a combined authentication value, and (d) authenticating the user of secondary device using the combined authentication value.

In still yet another aspect, a device includes: a receiver configured to receive a primary authentication value representative of a degree of authentication of a user from a primary device of the ad hoc network; a biometric parameter detector; and a processing circuit configured to determine whether to perform a secondary authentication of the user and further configured, if secondary authentication is to be performed, to (a) obtain at least one biometric parameter representative of the user of a secondary device using the biometric parameter detector, (b) determine a secondary authentication value representative of a degree of authentication of the user of the secondary device based on the at least one biometric parameter, (c) combine the primary authentication value received from the primary device with the secondary authentication value to yield a combined authentication value, and (d) authenticate the user of secondary device using the combined authentication value.

BRIEF DESCRIPTION OF THE DRAWINGS

FIG. 18 summarizes further aspects of an exemplary method for use by a primary device of an ad hoc network for authentication of a user.

DETAILED DESCRIPTION

Figure 1:
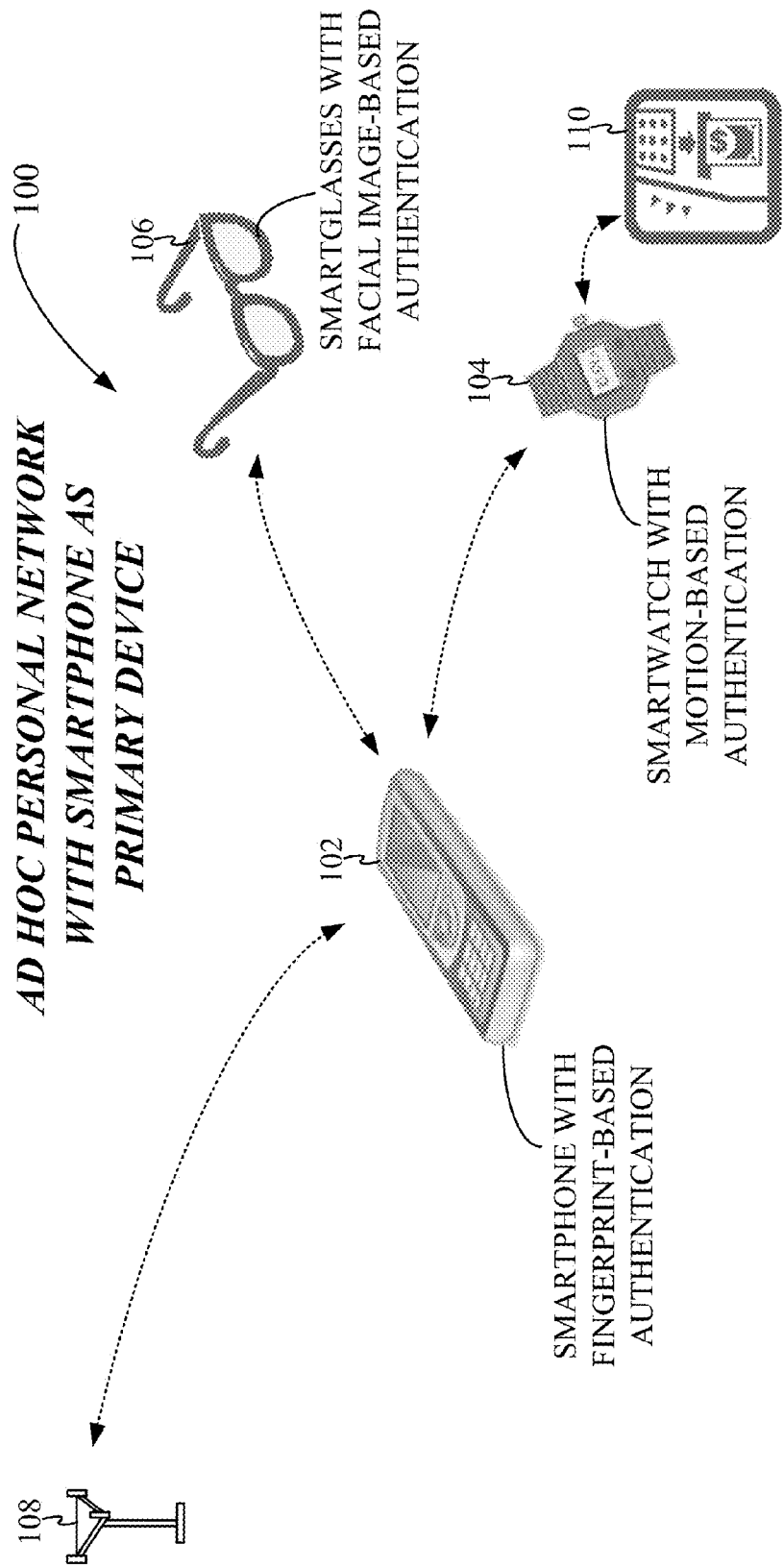
FIG. 1 illustrates an exemplary ad hoc personal network of primary and secondary devices with a smartphone as the primary device.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to biometric authentication within an ad hoc wireless personal network or similar networks composed of a primary and one or more secondary devices. In one example, biometric authentication is provided in which a primary device (e.g. smartphone, tablet, etc.) is equipped to perform biometric authentication using one or more relatively sophisticated and reliable biometric authentication techniques such as fingerprint authentication. An ad hoc personal network is created by the primary device with one or more secondary devices using various grouping policies such as proximity policies and other permissions. In one example, an ad hoc wireless network is a point to point network between the primary device and secondary device in which no other entity manages or assists in the establishment of the point to point connection (e.g., no other entity is involved in establishing and/or transmissions over the ad hoc network). The primary device shares an authentication value (e.g., score or trust level) with other devices in the ad hoc network. Each secondary device in the network can then perform additional user authentication in accordance with user preferences or other requirements. Secondary authentication can be performed using a relatively low reliability sensor such as a digital camera (e.g. facial recognition), a microphone (e.g. voice recognition) or an accelerometer (e.g. gesture recognition.) The secondary authentication results are combined with the biometric authentication value (e.g., score or level) from the primary device to form a final authentication value (e.g., score or level), which is then used to authenticate the user of the secondary device for one or more transactions such as consumer purchases, secure content access, secure control, etc. If there are no additional user authentication requirements for a particular secondary device, the biometric authentication value (e.g., score or level) of the primary device is mapped to the secondary device authentication value (e.g., score or level).

Figure 2:
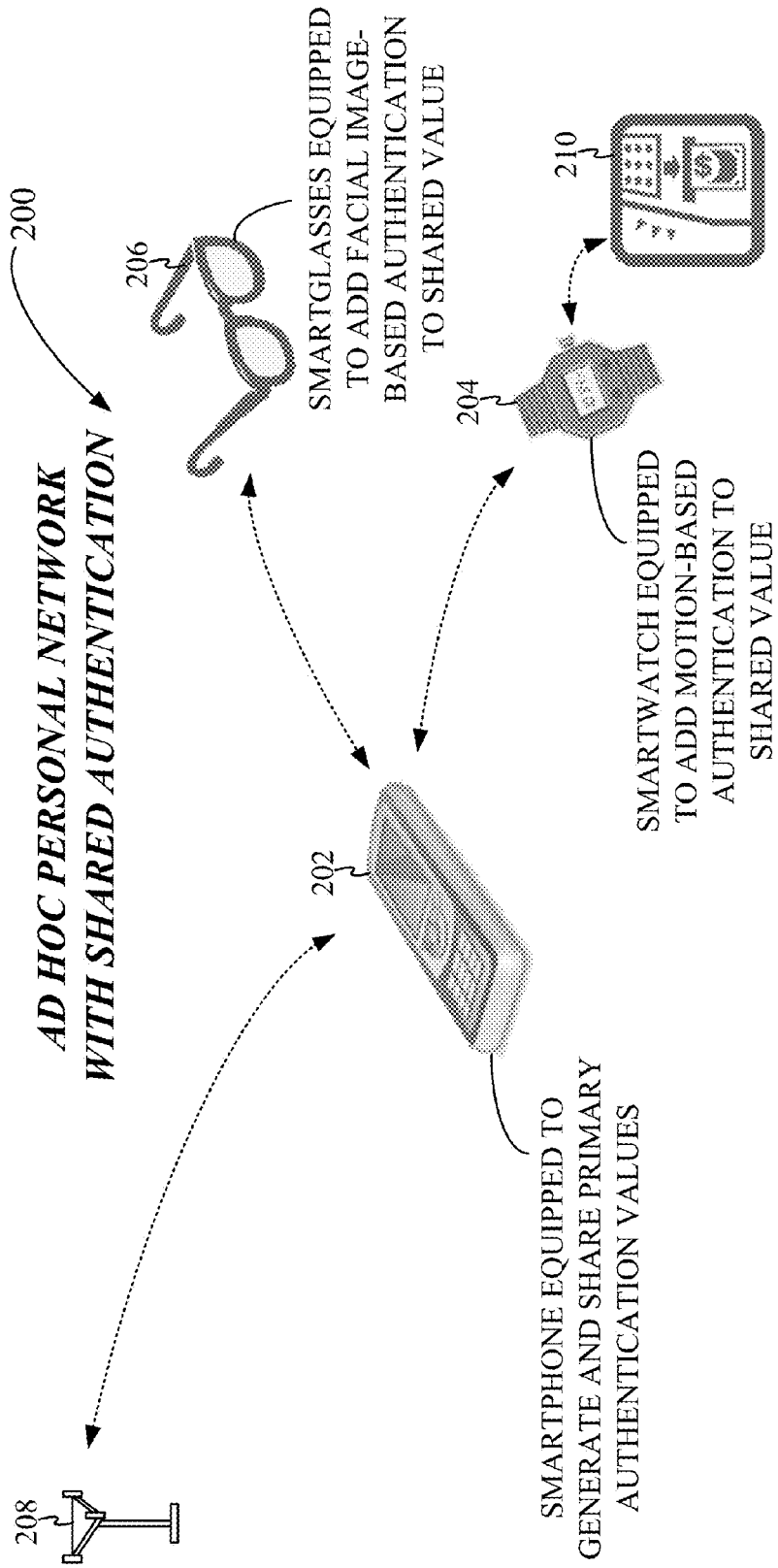
FIG. 2 illustrates an ad hoc personal network of primary and secondary devices with shared authentication where a smartphone is the primary device.

FIG. 2 illustrates an example of an ad hoc personal network 200 having a smartphone 202 equipped to generate and share a primary authentication value (e.g., score or trust level) and other data such as pairing rules, device identifiers (IDs), etc. A smartwatch 204 is equipped to receive the primary authentication value and other data and add motion capture-based authentication to the primary authentication value to yield a final combined secondary authentication score (or trust level) that is specific to the smartwatch 204. A pair of smartglasses 206 is also equipped to receive the primary authentication score and other data. The smartglasses 206 add facial image-based authentication to the primary authentication value to yield a final combined secondary authentication value (e.g., score or trust level) that is specific to the smartglasses 206. In this example, the smartphone 202 is in communication with a cellular network via a base station 208 using wireless signals in accordance with any suitable technology but might be in communication with external systems using WiFi or other wireless networks. The smartphone 202 is in communication with the smartwatch 204 and the smartglasses 206 via any suitable local wireless transmission protocol. For example, the smartphone may be a hotspot.

In the example of FIG. 2, the smartphone 202 is equipped to initially authenticate the user with a relatively reliable fingerprint-based biometric authentication (such as by employing a fingerprint sensor, not shown) and to generate the aforementioned primary authentication value. The primary authentication value may vary, for example, depending upon how close the match is between the input fingerprint of the user and a stored fingerprint for the user. The smartphone 202 transmits the resulting primary authentication value to all of the secondary devices in the ad hoc network, assuming the secondary devices meet any required permissions and the devices are in proximity. For an ad hoc network of the type shown in FIG. 2, the proximity range may be quite small since it is assumed the devices will all be carried or worn by the user. The user can also authenticate the smartwatch 204, if needed, by making a predetermined arm motion, which is detected by an internal accelerometer, not separately shown. The smartwatch 204 generates a secondary authentication value based on how closely the arm motion matches a stored motion pattern for the user. The smartwatch 204 combines the secondary authentication value with the primary authentication value received from the smartphone 202 to generate and save a final combined authentication value. This value may thereafter be compared against various predetermined thresholds to authenticate particular transactions. Note that whether the smartwatch requires separate user authentication can depend on various factors, such as the primary authentication value. If the primary authentication value is relative high and hence trustworthy, secondary authentication may be not required. If the primary authentication is lower and hence less trustworthy, then secondary authentication may be required. As another example, secondary authentication may be required if the smartwatch is enabled to perform financial transaction but not required if only enabled to perform other transactions.

Similarly, the user may be required to authenticate to the smartglasses 206 by having the glasses take a digital photo of the face of the user. The smartglasses then generate a secondary authentication value based on how closely the photo matches a pre-stored image of the user and combines the secondary authentication value with the primary authentication value received from the smartphone to generate and save a final combined authentication value. The initial authentication of the user via the primary and secondary devices of the network may be required relatively infrequently so as not to inconvenience the user. Whenever a secondary device ceases to be in close proximity with the smartphone (or fails to satisfy other required permissions or parameters), the device is deauthenticated and cannot be used to authorize transactions or access systems/devices unless re-authenticated.

At some point, the user may seek to obtain cash from an ATM 210 by waving the smartwatch near a near-field scanner (not separately shown) of the ATM. The smartwatch 204 detects the attempt to obtain cash based on responsive signals received from the ATM and verifies that the final authentication value is sufficient to authorize the transaction by, for example, comparing the final authentication value of the smartwatch to a predetermined threshold for cash withdrawal. The threshold may vary depending upon the amount of cash to be withdrawn so as to require a higher degree of authentication for larger amounts. If the final authentication value for the smartwatch 204 exceeds the appropriate threshold, the user of the smartwatch 204 is thereby properly authenticated for the transaction. The smartwatch then transmits any required credentials to the ATM machine (such as the passcode or personal identification number (PIN) associated with the ATM account) to complete the transaction. Assuming the credentials are satisfactory, the ATM dispenses the cash.

In this manner, the user can conveniently perform modest financial transactions without the burden of requiring concurrent authentication using the smartphone (which may be stowed in the user's purse or briefcase or kept within a zippered or buttoned pocket) and without needing to enter any PIN or passcode directly in to the ATM (which might be inconvenient for the user if the passcode is hard to remember and would negate the convenience of using the smartwatch to trigger the transaction.) Yet, such transactions are substantially secure because two types of authentication are employed: the initial fingerprint-based authentication of the smartphone and the motion capture-based authentication of the smartwatch. Moreover, the smartwatch must be in close proximity to the smartphone during the transaction, otherwise the smartwatch is deauthenticated and cannot authorize the transaction.

Note also that neither of the individual authentication procedures need be perfect so long as the combined final value is sufficiently high. For example, the initial fingerprint authentication may not be flawless due to a slightly smudged fingerprint. Likewise, the user need not exactly emulate the required arm motion when authenticating the smartwatch. However, the combined authentication value may nevertheless be sufficiently high to reliably authenticate the user for particular transactions. In other examples, no secondary authentication is required by the smartwatch and the primary authentication value is simply mapped to the smartwatch. As noted, the threshold for authentication may depend on the type and amount of the transaction, with more precise biometric authentication required for larger financial transactions. Note also that if the user is not deemed to be sufficiently authenticated for the transaction based on the final combined value of the smartwatch 204, the user can still directly authenticate the transaction by entering the PIN into the keypad of the ATM or by using the smartphone by reapplying the fingerprint to the smartphone biometric sensor.

As another transaction example for use with the ad hoc network of FIG. 2, the user may wish to access confidential information from an Internet website via the smartglasses 206. The smartglasses 206 will compare its final authentication value to a predetermined threshold to determine whether the user of the smartglasses is sufficiently authenticated to permit access to the particular website. If the final authentication value exceeds the threshold, the user is thereby authenticated and the appropriate access credentials (e.g. passwords or PINs) are forwarded to the website via the Internet to gain access to the website. The requested information is then downloaded using the Internet and displayed via the smartglasses. In this manner, the user can conveniently access confidential information via the smartglasses without the burden of requiring direct entry of passwords or PINs. Yet, there is little or no risk that an unauthorized person could access the information using another person's misplaced or stolen smartglasses since the glasses would be deauthenticated once they are no longer in closer proximity to the smartphone of the user.

Figure 3:
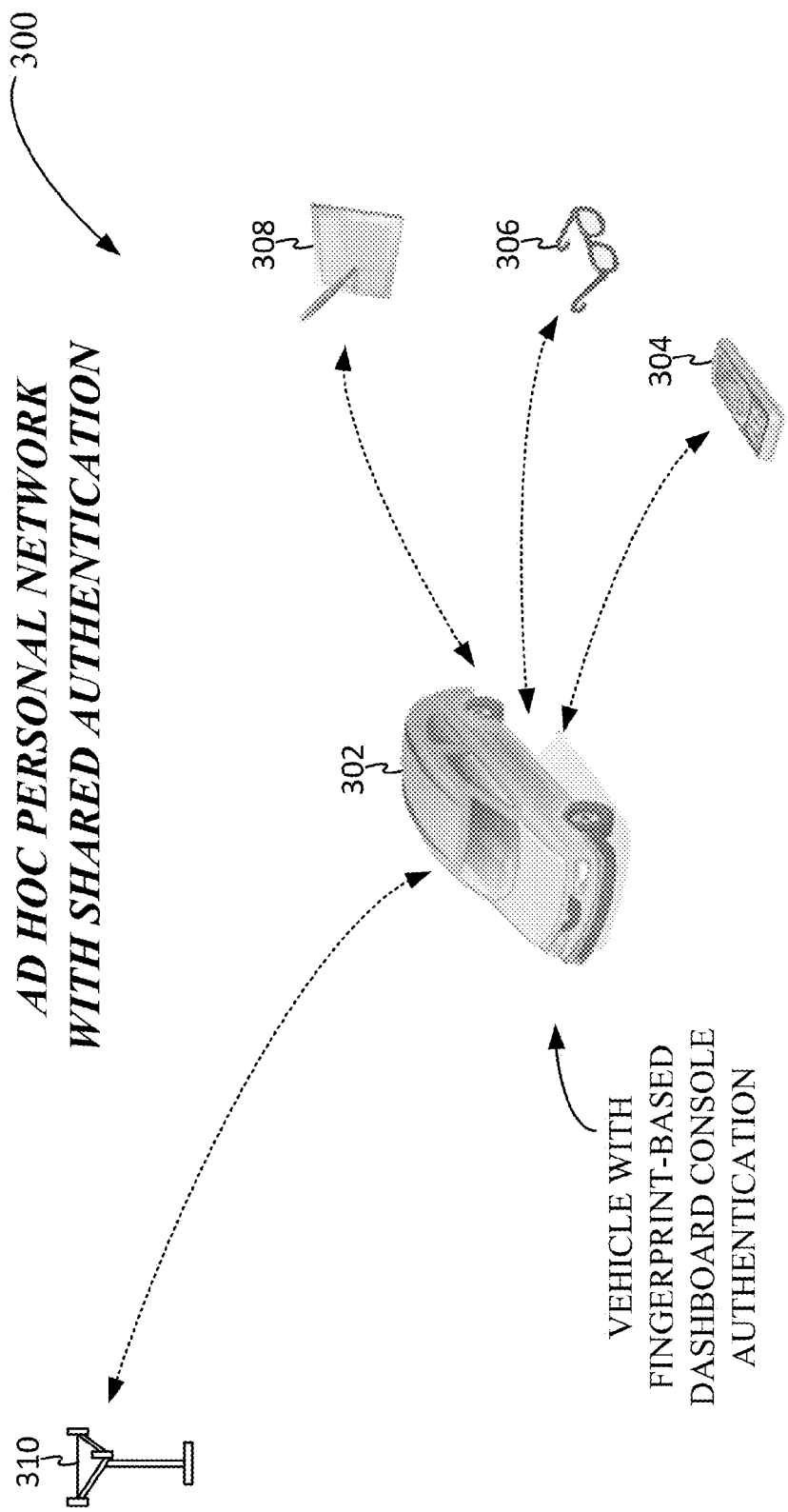
FIG. 3 illustrates an ad hoc personal network of primary and secondary devices with shared authentication where a vehicle computer is the primary device.

FIG. 3 illustrates another example of an ad hoc personal network 300. In the example, the dashboard console computer of a car 302 or other vehicle is the primary device of the ad hoc network. The various mobile devices of the occupants of the vehicle are the secondary devices. In the example of FIG. 3, the exemplary secondary devices include a smartphone 304, a pair of smartglasses 306 and a tablet computer 308. The dashboard console computer of the car 302 is shown in communication with a cellular network via one or more base stations 310. In the example of FIG. 3, the dashboard console includes a fingerprint sensor (or other suitable biometric sensor, not separately shown) that authenticates the operator of the vehicle to allow operation of the vehicle and to also allow access by the various secondary mobile devices to a wireless network within the vehicle such as a vehicle hot spot. The dashboard console of the car 302 generates the aforementioned primary authentication value for transmission to all of the secondary devices in the ad hoc network of the vehicle, assuming the secondary devices meet any required permissions and remain in proximity. In a typical case, the various devices of family members are all pre-registered to the car and hence are automatically granted access to the hotspot within the car. For the network of FIG. 3, the proximity range will be wider than that of FIG. 2 since some passengers may be in the front seat while others are in the back. Also, the proximity may be set such that devices remain in the ad hoc network so long as the devices are relatively close to the vehicle, thereby permitting occupants to carry their devices from the vehicle at rest stops or the like without being immediately disconnected from the ad hoc network. Once a device is taken sufficiently far from the vehicle, the device is deauthenticated. In other examples, once a device is removed from the car, it is immediately deauthenticated and removed from the ad hoc network.

While the ad hoc network is valid (such as while the occupants remain seated within the vehicle), the individual occupants may, for example, download media content from memory the components of the vehicle (subject to any content locks imposed by the owner of the vehicle.) As one example, child passengers may each access different stored media (such as music, movies, television shows, etc.) from the vehicle via their own personal devices using the ad hoc network. Access to such media content might otherwise require burdensome authentication of each individual device. With shared authentication via the ad hoc network of the vehicle, each individual device is instead automatically and conveniently authenticated based on the authentication value of the operator of the vehicle. The car console computer may be programmed to permit different operators of the vehicle to authorize different (or no) media content. For example, when a teenage driver is operating the vehicle, minimal or no secondary device authentication may be permitted so as to limit overall driver distraction.

Other examples of vehicular ad hoc networks include networks within other types of vehicles such as busses, trucks, aircraft, watercraft, motorcycles, etc. Still other ad hoc networks may include health monitoring devices, such as heart rate monitors or blood pressure monitors that might be paired with a smartphone or tablet. Such health monitoring devices may be selectively authorized to share information with a remote health monitoring system such as a system operated by a physician or other health care provider. Other ad hoc networks can include building control networks that control the operations of appliances within a house or other structure, such as by controlling thermostats, security monitors, shades, etc. In one example, detection of intrusion into a house by a stranger triggers an immediate deauthentication of all devices within the home ad hoc network, at least for selected purposes. Examples of some of these ad hoc systems are described in greater detail below.

Figure 4:
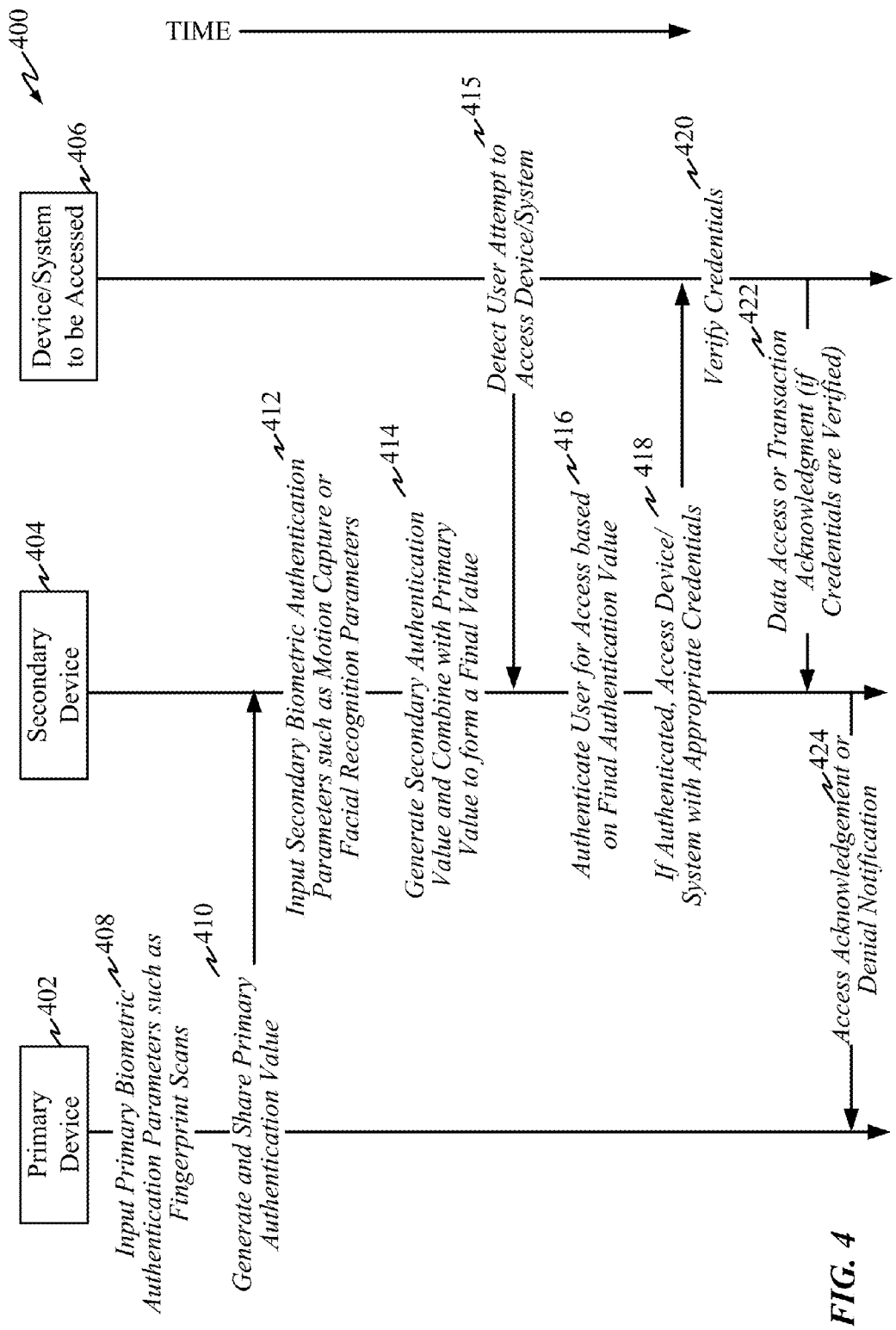
FIG. 4 is a timing diagram illustrating operations performed by components of an ad hoc personal network with a primary and secondary device, wherein the secondary device is in communication with a device/system to be accessed.

FIG. 4 summarizes some of the features of the aforementioned ad hoc networks with reference to a timing diagram 400 illustrating operations of a primary device 402, a secondary device 404 and a device or system 406 to be accessed (such as an ATM, secure website, etc.) At 408, the primary device inputs primary biometric authentication parameters such as fingerprint scans and, at 410, generates a primary authentication value based on the primary biometric authentication parameters and shares the value with the secondary device 404. At 412, the secondary device 404 inputs secondary biometric authentication parameters such as motion capture nor facial recognition parameters (assuming secondary authentication is enabled.) At 414, the secondary device 404 generates a secondary authentication value and combines it with the primary authentication value to form a final authentication value for the secondary device The system/device 406 detects an access attempt by the user 415, such as an attempt to obtain cash from an ATM, access a website, etc. In response, at 416, secondary device 404 attempts to authenticate the user for the requested access based on the final authentication value. As already noted, authentication may depend on the particular system or device to be accessed and the purpose of the access with a higher authentication value required to access more sensitive systems or to initiate financial transactions of greater value. If authenticated, the secondary device 404 then sends appropriate credentials (such as passwords or PINs) to the system/device 406 to be accessed 418. The system/device 406 verifies the credentials 420 and provides the accessed data to the secondary device (if the credentials are verified) or sends a transaction acknowledgement 422 in the case of a completed financial transaction or the like. The secondary device 404 forwards an access acknowledgement or a denial notification 424 to the primary device 402, depending upon whether the user was properly authenticated and the credentials were accepted.

Although not shown in FIG. 4, the secondary device can be deauthenticated upon detection of various triggers such as removal of the secondary device from the proximity of the primary device. Upon detecting deauthentication events using the primary device of the network, secondary devices in the ad hoc network are also deauthenticated. Upon detecting deauthentication events on a secondary device, all other secondary devices in the ad-hoc network are also deauthenticated. Upon detecting a "threat condition" by a secondary device, a deauthentication request is issued to the primary device, in addition to deauthentication of the secondary device. Examples of threat conditions include violation of ad hoc network rules (e.g. proximity rules) detected by a secondary device that indicates a compromise on the primary device. Other examples including any indication that a device might be spoofed, hacked or otherwise compromised.

Among the features of the ad hoc networks described herein: potentially better user experience on secondary devices; removal of redundant authentication; seamless ad hoc security network creation; and enhanced security on the primary device. To summarize, biometric authentication in at least some of the ad hoc personal networks described herein includes: forming an ad hoc personal network using user preferences (e.g. proximity definition, device permissions); sharing a biometric authentication value (e.g., score or level) from a primary device to the secondary devices in the ad-hoc network; combining a shared biometric value with a low reliability secondary authentication in secondary devices to form a final authentication value; and mapping of the biometric value to secondary device authentication. The ad hoc network can also provide for: deauthentication of a secondary device upon deauthentication on primary device; deauthentication of secondary devices upon violation of the network rules; and remotely issuing deauthentication to primary device upon threat detection in secondary devices.
Exemplary Ad Hoc Network Systems, Methods and Components Various exemplary systems and methods will now be described for use with personal ad hoc networks. In many of the examples, a smartphone is used as the primary device. For the sake of completeness, a brief description of the hardware of an exemplary smartphone will be set forth, which includes components for generating and sharing primary authentication values. Other primary devices such as tablets, car consoles or the like may include at least some similar components.

Figure 5:
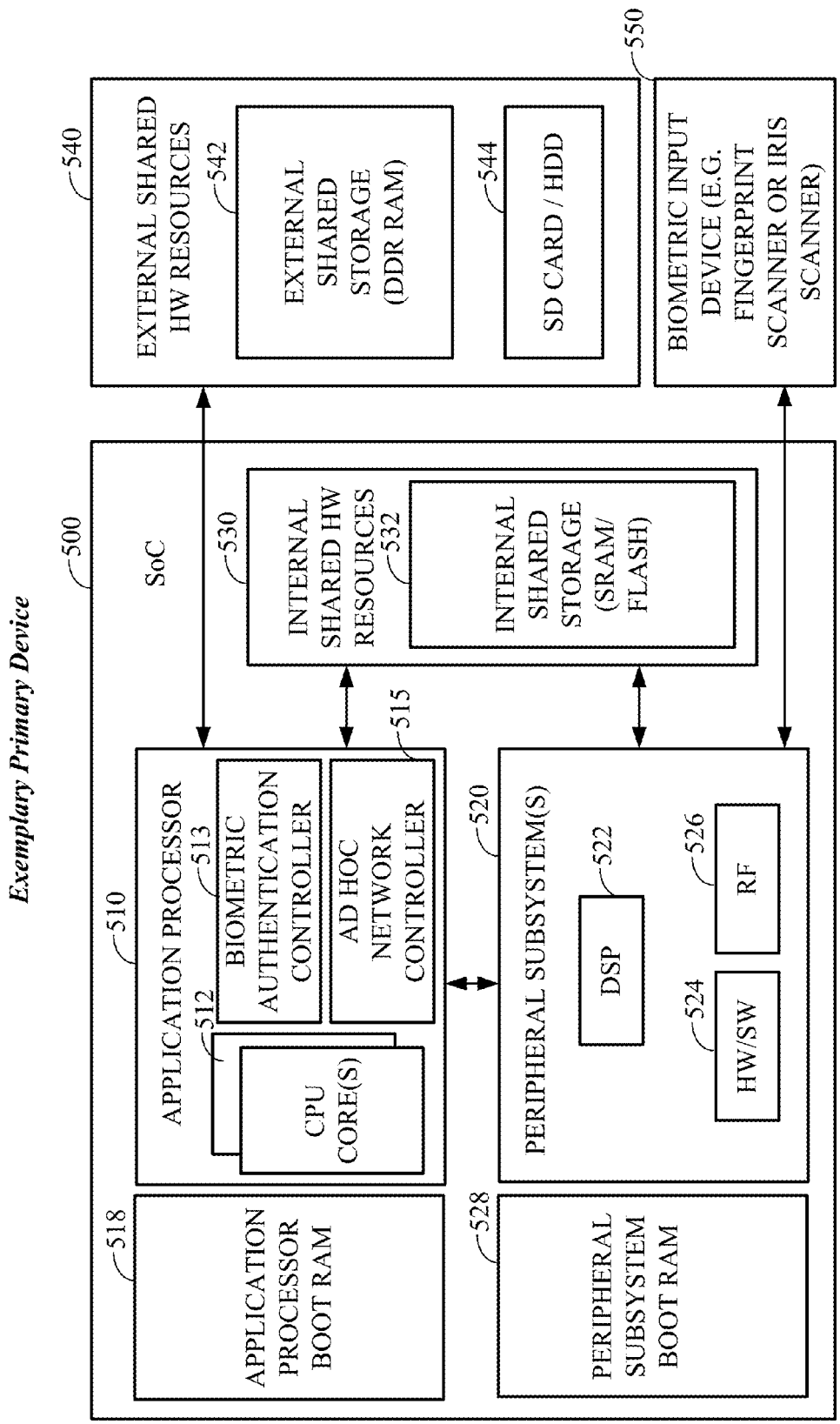
FIG. 5 is a block diagram of a system on a chip (SoC) processing circuit of a mobile communication device of a primary device of an ad hoc network in accordance with an illustrative example.

FIG. 5 illustrates a system on a chip (SoC) processing circuit 500 of a smartphone or other mobile communication device in accordance with one example where various novel features may be exploited. The SoC processing circuit may be a Snapdragon™ processing circuit manufactured by Qualcomm Incorporated. SoC processing circuit 500 includes an application processing circuit 510, which includes a multi-core CPU 512. Application processing circuit 510 typically controls operation of all components of the mobile communication device. In one aspect, application processing circuit 510 includes a primary biometric authentication controller 513 equipped to generate a primary authentication value (e.g., score or level), which is then shared with other devices within the ad hoc network of which the smartphone is the primary device. The application processing circuit 510 also includes an ad hoc network controller 515 for controlling the formation and termination of an ad hoc network with various secondary devices. Application processing circuit 510 may include a boot ROM 518 that stores boot sequence instructions for the various components of SoC processing circuit 500. SoC processing circuit 500 further includes one or more peripheral subsystems 520 controlled by application processing circuit 510. Peripheral subsystems 520 may include but are not limited to a storage subsystem (e.g., read-only memory (ROM), random access memory (RAM)), a video/graphics subsystem (e.g., digital signal processing circuit (DSP), graphics processing circuit unit (GPU)), an audio subsystem (e.g., DSP, analog-to-digital converter (ADC), digital-to-analog converter (DAC)), a power management subsystem, security subsystem (e.g., encryption, digital rights management (DRM)), an input/output (I/O) subsystem (e.g., keyboard, touchscreen) and wired and wireless connectivity subsystems (e.g., universal serial bus (USB), Global Positioning System (GPS), WiFi, Global System Mobile (GSM), Code Division Multiple Access (CDMA), 4G Long Term Evolution (LTE) modems). Exemplary peripheral subsystem 520, which is a modem subsystem, includes a DSP 522, various hardware (HW) and software (SW) components 524, and various radio-frequency (RF) components 526. In one aspect, each peripheral subsystem 520 also includes a boot ROM 528 that stores a primary boot image (not shown) of the associated peripheral subsystems 520.

SoC processing circuit 500 further includes various internal shared HW resources 530, such as an internal shared storage 532 (e.g. static RAM (SRAM), double-data rate (DDR) synchronous dynamic (SD) RAM, DRAM, Flash memory, etc.), which is shared by application processing circuit 510 and various peripheral subsystems 520 to store various runtime data. In one aspect, the components 510, 518, 520, 528 and 530 of SoC processing circuit 500 may be integrated on a single-chip substrate. SoC processing circuit 500 further includes various external shared HW resources 540, which may be located on a different chip substrate and communicate with the SoC processing circuit 500 via a system bus (not shown). External shared HW resources 540 may include, for example, an external shared storage 542 (e.g. DDR RAM, DRAM, Flash memory) and/or permanent data storage 544 (e.g., a Secure Digital (SD) card or Hard Disk Drive (HDD), etc.), which are shared by application processing circuit 510 and various peripheral subsystems 520 to store various types of data, such as an operating system (OS) information, system files, programs, applications, user data, audio/video files, etc. When the mobile communication device incorporating the SoC is activated, secure SoC processing circuit 500 begins a system boot up process. In particular, application processing circuit 510 accesses boot ROM 518 to retrieve boot instructions for SoC processing circuit 500, including boot sequence instructions for various peripheral subsystems 520. Peripheral subsystems 520 may also have additional peripheral boot RAM 528. Additionally, the smartphone includes a biometric input device 550 such as a fingerprint scanner or an iris scanner for inputting biometric parameters from a user for generating the primary biometric authentication value by the biometric authentication controller 513. Depending upon the implementation, the iris scanner may exploit a digital camera (not separately shown) of the smartphone.

Figure 6:
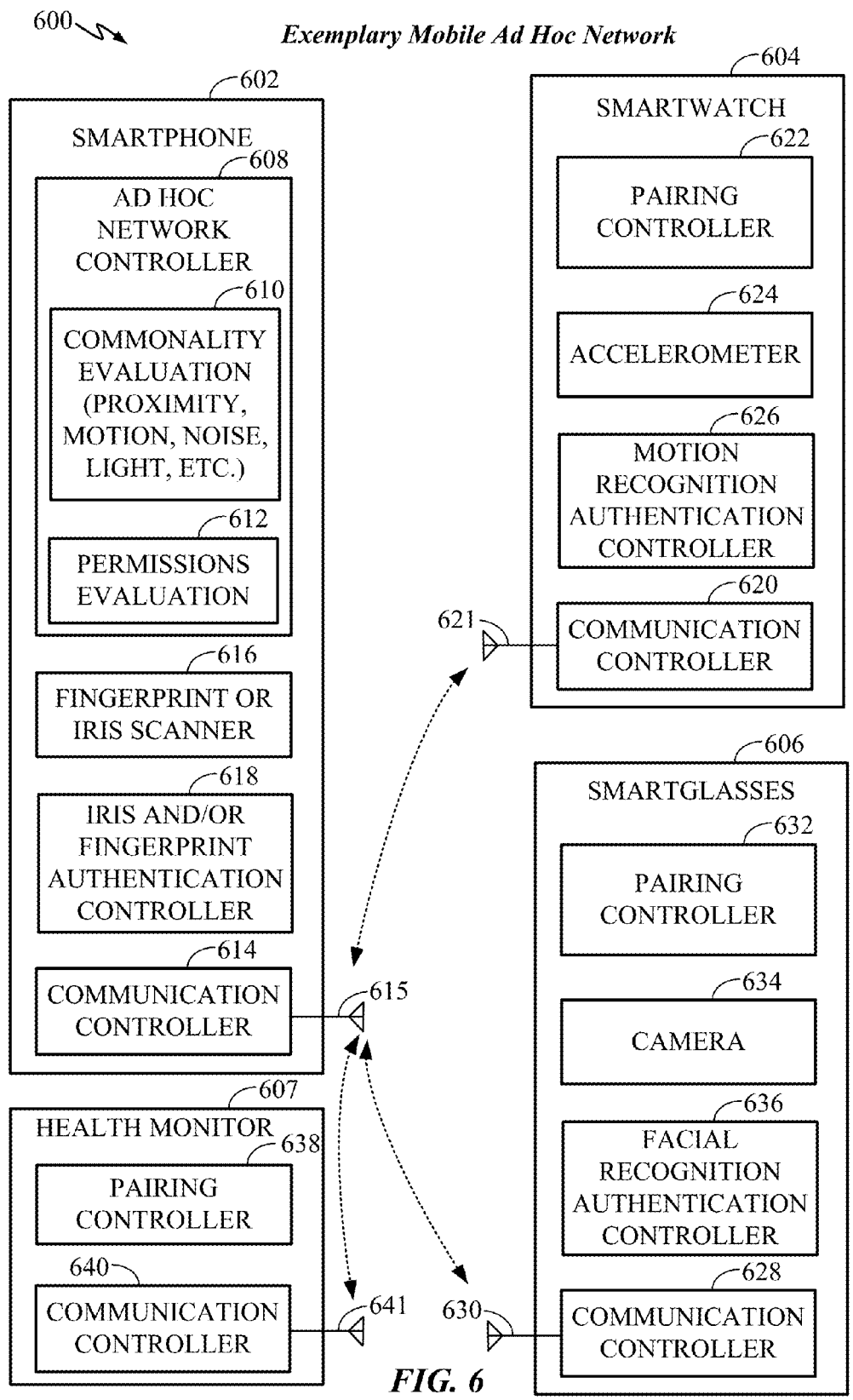
FIG. 6 is a block diagram of primary and secondary components an ad hoc network accordance with an illustrative example where a smartphone is the primary device of the network.

FIG. 6 illustrates selected components of devices within an exemplary mobile ad hoc network 600 where the primary device is a smartphone 602 and the secondary devices include a smartwatch 604, smartglasses 606 and a health monitor 607 such as a heart rate monitor or the like. Only selected internal components pertinent to the ad hoc network are shown within the various devices. Each device will include other components for implementing the other functions of the device. Referring first to the smartphone 602, an ad hoc network controller 608 controls the formation and termination of an ad hoc network using a commonality evaluation controller 610 and permissions evaluation controller 612. The commonality evaluation controller detects any secondary devices in communication with the smartphone 602 via a communication controller 614 (having an antenna 615) and assesses the degree of commonality between the smartphone and the secondary device. In a typical example, the communication controller 614 may be a hotspot controller but can correspond to any suitable device for communication directly (or via intermediate systems) with the secondary devices. Also, typically, the various secondary devices of the user are pre-registered for use with the smartphone 602 so that the smartphone can ignore any and all secondary devices that are not pre-registered.

Assuming a particular secondary device is in communication with the smartphone and is pre-registered, such as smartwatch 604, the commonality evaluation controller 610 detects or otherwise obtains various parameters associated with the smartphone and the secondary device from which a degree of commonality of the two devices can be detected, measured, determined or otherwise assessed. If a sufficient degree of commonality is found, the secondary device is invited into the ad hoc network of the primary device. For example, the commonality evaluation controller 610 of the smartphone may detect the location of the smartphone and the smartwatch 604 based on GPS signals and determine that the two devices have sufficient commonality if they are in close proximity to one another. The required degree of proximity may be pre-programmed and, as noted above, may be relatively close for a personal ad hoc network composed of user devices meant to be carried or worn by a user. In some cases, the mere fact that a secondary device is in communication with the primary device is sufficient to establish the requisite degree of proximity, especially if communication is achieved via relatively short range communication such as a WiFi hotspot.

Additionally or alternatively, the commonality evaluation controller 610 may assess parameters such as motion, ambient noise, ambient light, etc., to assess commonality. For example, the smartphone 602 may use its microphone or camera to monitor ambient noise and ambient light conditions for comparison with ambient noise and light conditions detected via the microphone or camera of a secondary device (such as smartglasses 606.) If the devices are found to be detecting the same ambient light or noise, they are deemed to be in the same locale. The commonality evaluation controller 610 then combines the various parameters representative of commonality into a single value for comparison against a commonality threshold to determine if a particular secondary device should be invited into the ad hoc network. In some examples, commonality is specified using a set of commonality rules which, if violated, trigger deauthentication of a particular secondary device or, in some cases, termination of the entire ad hoc network. Assuming a particular secondary device, such as smartwatch 604, is to be invited in the ad hoc network, suitable pairing signals may be generated and transmitted via the commination controller 614.

Insofar as permissions are concerned, the permissions evaluation controller 612 may be preprogrammed with various ad hoc network permission rules applicable to various secondary devices. These permission can include the aforementioned registration condition whereby only secondary devices that have pre-registered with the primary device can be permitted into the ad hoc network. Other permissions, however, may specify that a particular registered device can only be added to the ad hoc network under certain conditions. For example, certain devices may be added to the ad hoc network depending upon the communication network being used, with a particular device being added if Bluetooth™ is used but not if WiFi is used, or vice versa. If the user has not already been authenticated to the smartphone 602, a fingerprint or iris scanner 616 may be used to input biometric features, which are then authenticated via an iris and/or fingerprint authentication controller 618. The aforementioned primary authentication value (and other data such as the device IDs for the various devices within the ad hoc network) may then be sent to the various secondary devices.

Smartwatch 604 is shown as having a communication controller 620 and an antenna 621 for receiving signals from the smartphone 602 (either directly or via an intermediate communication network.) The smartwatch also includes a pairing controller 622 that responds to any pairing signals received from the smartphone 602 and sends responsive handshake signals to join the ad hoc network. In some cases, the secondary device will instead initiate access into the ad hoc network by detecting the primary device and sending a signal requesting to join the ad hoc network. This may help reduce power consumption in the primary device by eliminating the need for the primary device to periodically or continuously monitor for the presence of the secondary device. In one example, whenever the smartwatch 604 is activated, it sends a signal announcing its presence, which the smartphone can then respond to, if also active in and communication range. If secondary authentication is required with the smartwatch 604 (as determined based, e.g., on permissions or rules received from the smartphone), such secondary authorization may be performed using an accelerometer 624 to detect a distinctive and preprogrammed user motion and a motion recognition authorization controller 626 and that performs the secondary authentication.

Smartglasses 606 include similar components. Briefly, the smartglasses have a communication controller 628, antenna 630 and a pairing controller 632 (as well as numerous other components for implementing the functions of the smartglasses, not shown.) If secondary authentication is required, the secondary authorization may be performed using a camera 634 to detect a facial image and a facial recognition authorization controller 636 and that performs the secondary authentication. Heath monitor 607 also has a communication controller 640, antenna 641 and a pairing controller 638 (as well as other components for implementing the functions of the health monitor, not shown.) In this example, the health monitor has no secondary authentication capability and hence it merely uses the primary authentication value received from the smartphone 602. Although FIG. 6 only shows a single exemplary smartwatch, a pair of smartglasses and a health monitor, additional or alternative secondary devices may form the ad hoc network, including smartclothes, game devices and other full function mobile devices such as tablets or other smartphones.

Figure 7:
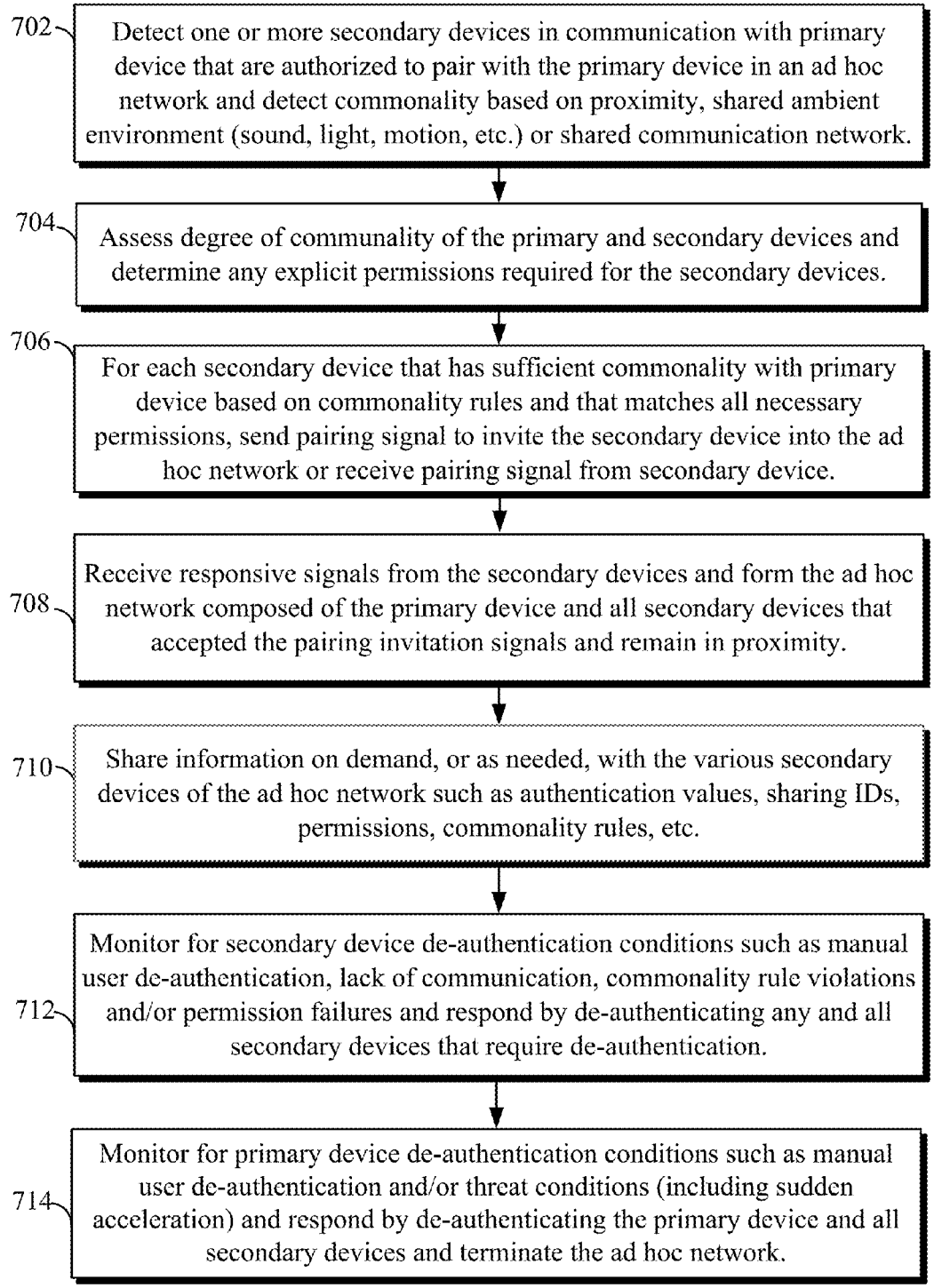
FIG. 7 illustrates an exemplary method for formation and termination of ad hoc network using a smartphone or other mobile primary device.

FIG. 7 is a flowchart 700 illustrating the formation and termination of an ad hoc network using a smartphone or other primary device. The primary device detects one or more secondary devices in communication with primary device that are authorized to pair with the primary device in an ad hoc network and detects commonality based on proximity, shared ambient environment (sound, light, motion, etc.) or shared communication network 702. The primary device assesses the degree of commonality of the primary and secondary devices and determines any explicit permissions required for the secondary devices 704. For each secondary device that has sufficient commonality with primary device as determined based on commonality rules and that matches all necessary permissions, the primary device sends pairing signal to invite the secondary device into the ad hoc network or receive pairing signal from secondary device 706. The primary device receives responsive signals from the secondary devices and forms the ad hoc network composed of the primary device and all secondary devices that accepted the pairing invitation signals and remain in proximity 708.

The primary device shares information on demand, or as needed, with the various secondary devices of the ad hoc network such as authentication values, sharing IDs, permissions, commonality rules, etc. 710. The primary device monitors for secondary device deauthentication conditions such as manual user deauthentication, lack of communication, commonality rule violations and/or permission failures and respond by deauthenticating any and all secondary devices that require deauthentication 712. The primary device monitors for primary device deauthentication conditions such as manual user deauthentication and/or threat conditions (including suspected spoofing or hacking) and responds by deauthenticating the primary device and all secondary devices and terminate the ad hoc network 714. Insofar as sudden acceleration is concerned, the device can detect the sudden acceleration associated with the device being dropped and send deauthentication signals to the secondary devices to terminate the ad hoc network under the expectation that the primary device will be damaged and thereafter might not be capable of deauthentication the secondary devices.

Figure 8:
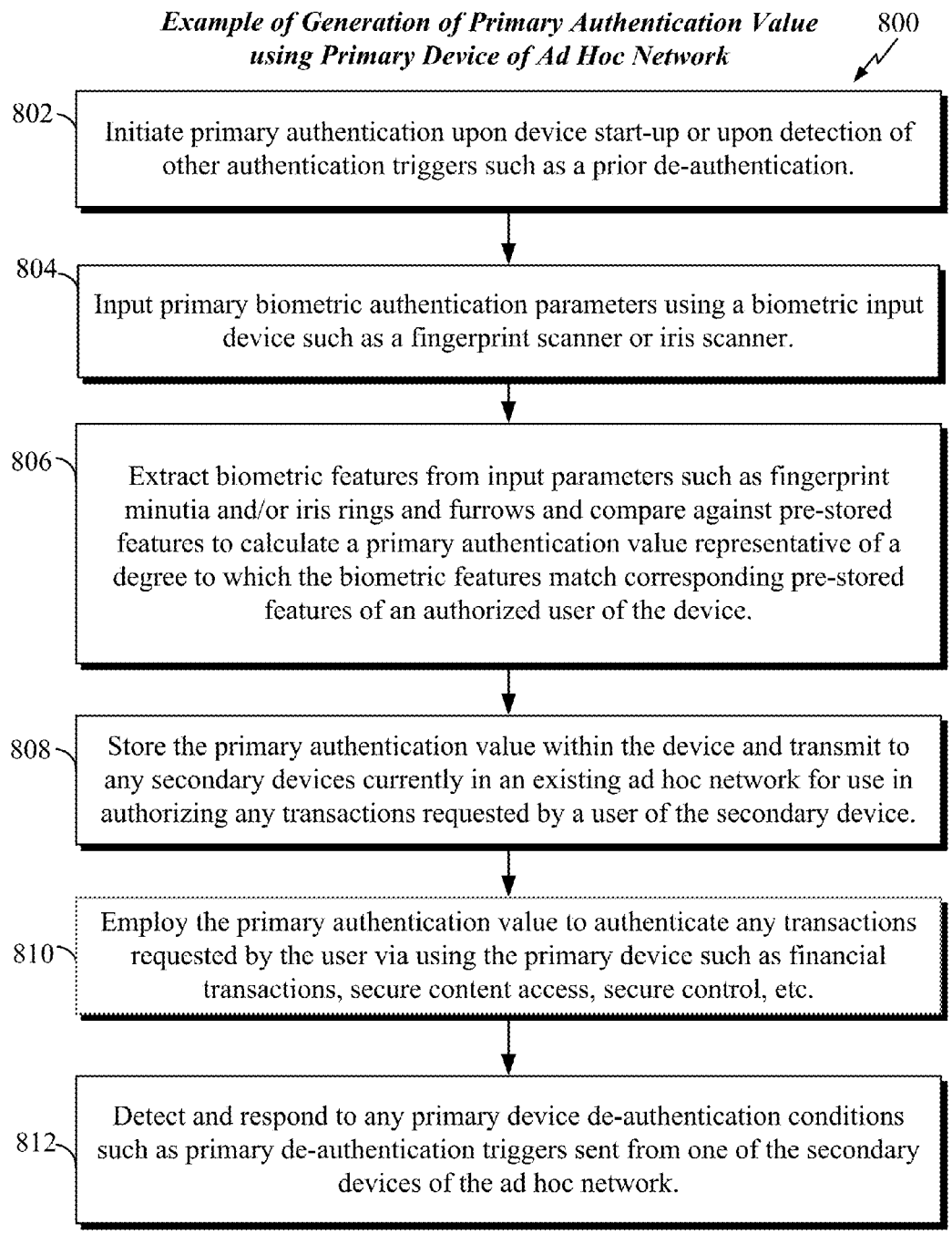
FIG. 8 illustrates an exemplary method for the generation of a primary authentication value using a primary device of an ad hoc network.

FIG. 8 is a flowchart 800 illustrating the generation of a primary authentication value using a smartphone or other primary device. The primary device initiates primary authentication upon device start-up or upon detection of other authentication triggers such as a prior deauthentication 802. The primary device inputs primary biometric authentication parameters using a biometric input device such as a fingerprint scanner or iris scanner 804. The primary device extracts biometric features from input parameters such as fingerprint minutia and/or iris rings and furrows and compares against pre-stored features to calculate a primary authentication value representative of a degree to which the biometric features match corresponding pre-stored features of an authorized user of the device 806. The primary device stores the primary authentication value within the device and transmits to any secondary devices currently in an existing ad hoc network for use in authorizing any transactions requested by a user of the secondary device 808. The primary device employs the primary authentication value to authenticate any transactions requested by the user via using the primary device such as financial transactions, secure content access, secure control, etc. 810. The primary device detects and responds to any primary device deauthentication conditions such as primary deauthentication triggers sent from one of the secondary devices of the ad hoc network 812.

Figure 9:
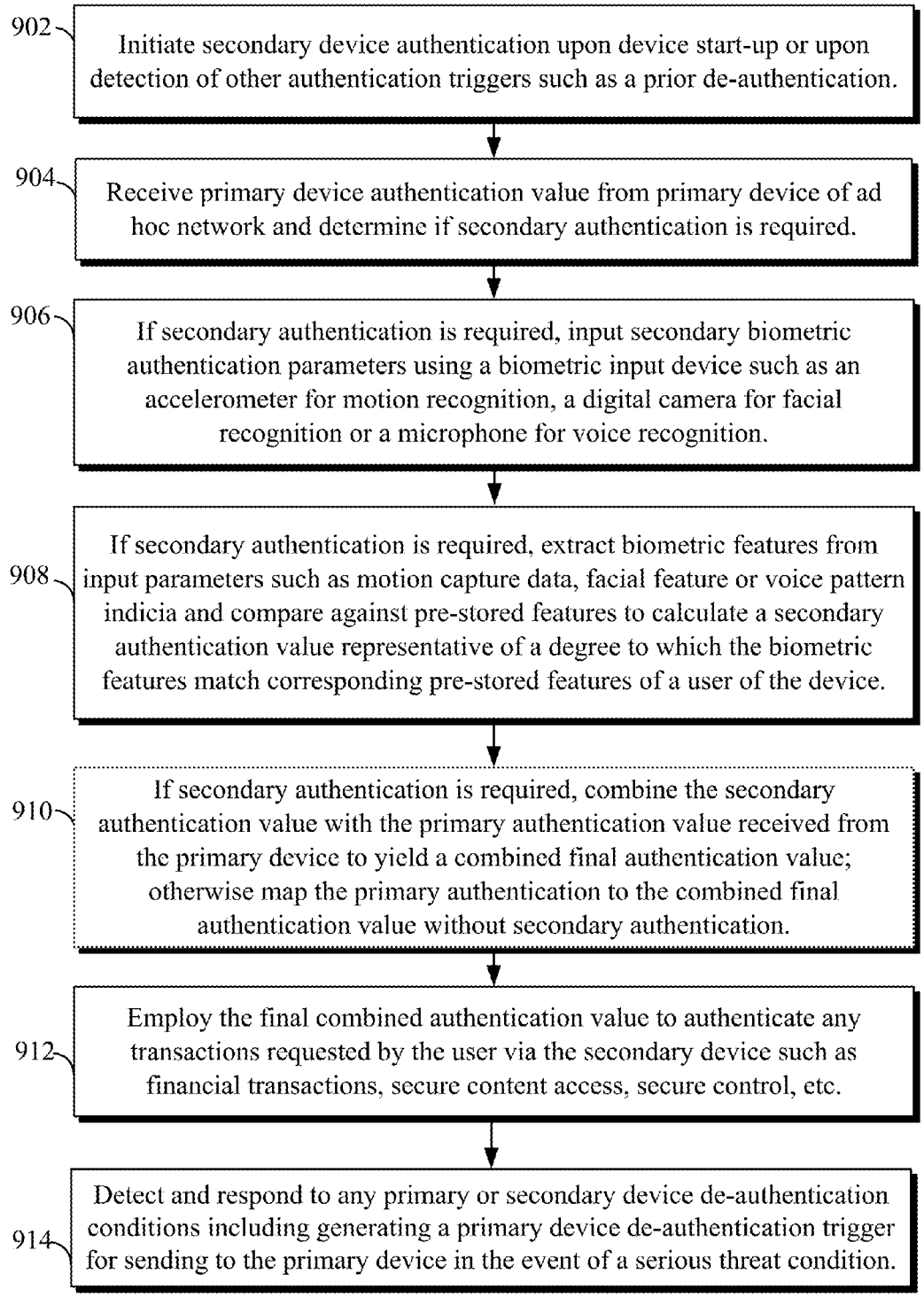
FIG. 9 illustrates an exemplary method for the generation of a final combined authentication value using a secondary device of ad hoc network.

FIG. 9 is a flowchart 900 illustrating the generation of a final combined authentication value using a secondary device of an ad hoc network. The secondary device initiates secondary device authentication upon device start-up or upon detection of other authentication triggers such as a prior deauthentication 902. The secondary device receives the primary device authentication value from the primary device of ad hoc network and determines if secondary authentication is required 904. If secondary authentication is required, the secondary device inputs secondary biometric authentication parameters using a biometric input device such as an accelerometer for motion recognition, a digital camera for facial recognition or a microphone for voice recognition 906. If secondary authentication is required, the secondary device extracts biometric features from input parameters such as motion capture data, facial feature or voice pattern indicia and compare against pre-stored features to calculate a secondary authentication value representative of a degree to which the biometric features match corresponding pre-stored features of a user of the device 908.

If secondary authentication is required, the secondary device combines the secondary authentication value with the primary authentication value received from the primary device to yield a combined final authentication value or otherwise maps the primary authentication to the combined final authentication value without secondary authentication 910. The secondary device employs the final combined authentication value to authenticate any transactions requested by the user via the secondary device such as financial transactions, secure content access, secure control, etc. 912. The secondary device detects and responds to any primary or secondary device deauthentication conditions including generating a primary device deauthentication trigger for sending to the primary device in the event of a serious threat condition 914 such as an indication that the primary device has been subject to a spoof or hack. Note that in some cases the secondary device of a particular ad hoc network may be a full function device such as a tablet or smartphone that has the same or greater capabilities as the primary device of the network. As such, the secondary device may have the capability to detect a threat condition that the primary device does not detect. For at least this reason, it is useful to allow a secondary device in the network to send a deauthentication trigger to the primary device and to all other devices in the network.

Figure 10:
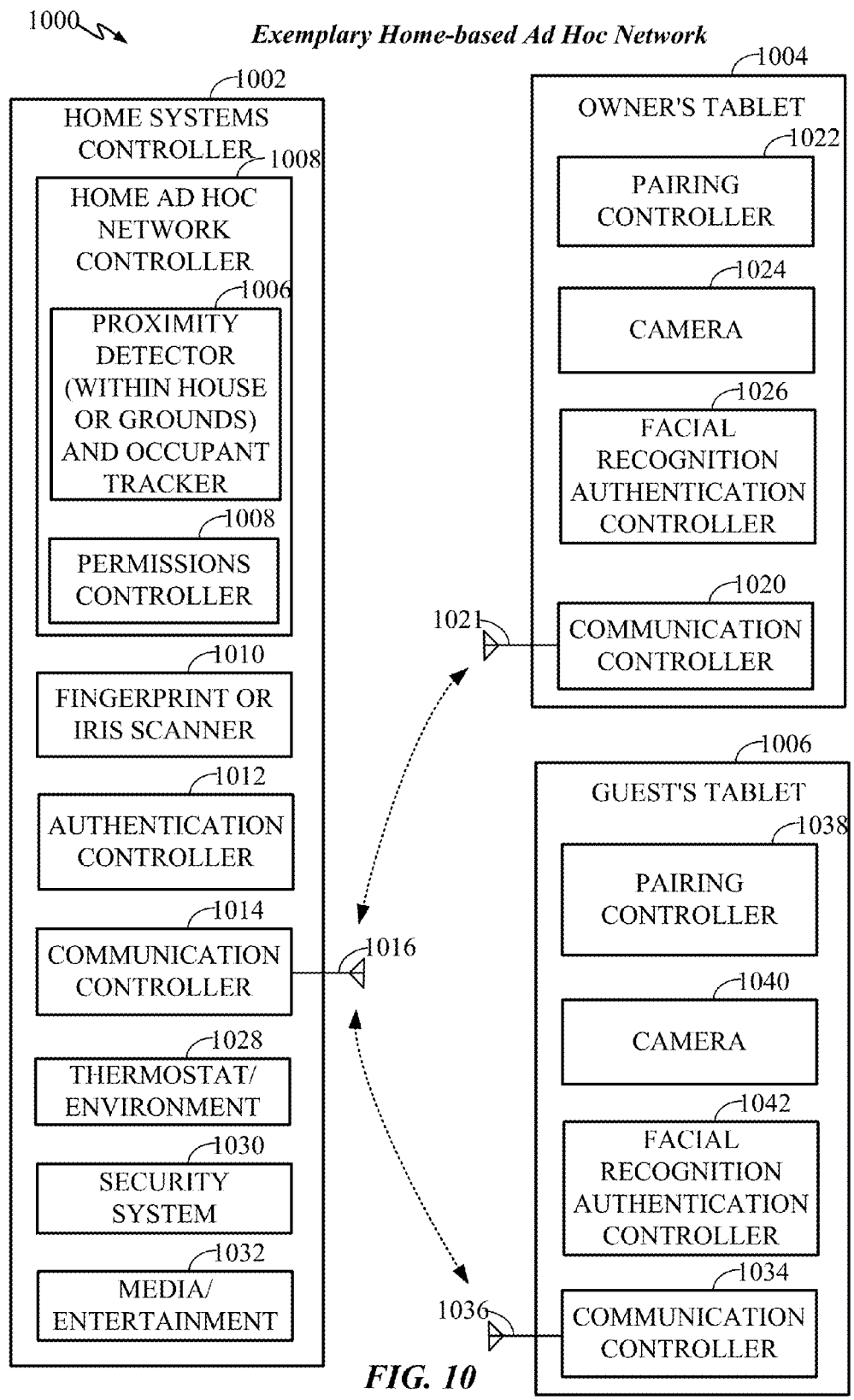
FIG. 10 is a block diagram of primary and secondary components an ad hoc network accordance with another illustrative example where a home systems controller is the primary device of the network.

FIG. 10 illustrates selected components of devices within an exemplary home-based ad hoc network 1000 where the primary device is a home systems controller 1002 and the secondary devices include an owner's tablet 1004 and a guest's tablet 1006. Only those internal components pertinent to the ad hoc network are shown within the various devices. Some of the components are the same or similar to those shown in FIG. 6 and hence will not be described again in detail. Referring first to the home systems controller 1002, a home ad hoc network controller 1008 controls the formation and termination of an ad hoc home network using a proximity detector 1010 and a permissions controller 1012. The proximity controller detects any secondary devices in communication with the home systems controller 1002 via a communication controller 1014 (having an antenna 1016) such as by detecting devices within the house, within particular rooms or the house, or within the grounds of the house. The communication controller 1014 may be a home hotspot controller. Also, typically, the various secondary devices of the owner and other permanent occupants of the house are pre-registered so that the home systems controller can automatically add or drop the devices from the ad hoc network as they are taken to and from the house over the course of a day.

Assuming a particular secondary device is within the house and is pre-registered, such as owner's tablet 1004, the secondary device is invited into the ad hoc network by sending suitable pairing signals via the commination controller 1014. If the owner or other occupants have not already been authenticated to the home system controller 1002, a fingerprint or iris scanner 1010 may be used to input biometric features, which are then authenticated via an iris and/or fingerprint authentication controller 1018. The aforementioned primary authentication value (and other data such as the device IDs for the various devices within the ad hoc network) may then be sent to the various secondary devices within the house. Note that if the home systems controller is so equipped, it can track the entry and exit of occupants via security monitors and detect the presence of an intruder.

Owner's tablet 1004 is shown as having a communication controller 1020 and an antenna 1021 for receiving signals from the home systems controller 1002 (either directly or via an intermediate communication network.) The owner's tablet also includes a pairing controller 1022 that responds to any pairing signals received from the home systems controller 1002 and sends responsive handshake signals to join the ad hoc home network. In one example, whenever the owner's tablet 1004 is activated, it sends a signal announcing its presence, which the home systems controller can then respond to. If secondary authentication is required with the owner's tablet 1004 (as determined based, e.g., on permissions or rules received from the home systems controller), such secondary authorization may be performed using a camera 1024 and a facial recognition authorization controller 1026 and that performs the secondary authentication. Once paired with the home systems controller, the owner's tablet can then be used to conveniently control various home systems such as a thermostat and environment controller 1028, a security system 1030 and a home media and entertainment system 1032.

Guest's tablet 1006 includes similar components to that of the owner's tablet but will be restricted from controller home systems. Briefly, the guest's tablet has a communication controller 1034, antenna 1036 and a pairing controller 1038 (as well as other components for implementing the functions of the health monitor, not shown.) If secondary authentication is required, the secondary authorization may be performed using a camera 1040 to detect a facial image and a facial recognition authorization controller 1042 and that performs the secondary authentication. Although FIG. 10 only shows an owner's tablet and one guest tablet, additional or alternative secondary devices may form the home ad hoc network, including smartclothes, health monitors game devices and other full function mobile devices such as tablets or other smartphones.

Figure 11:
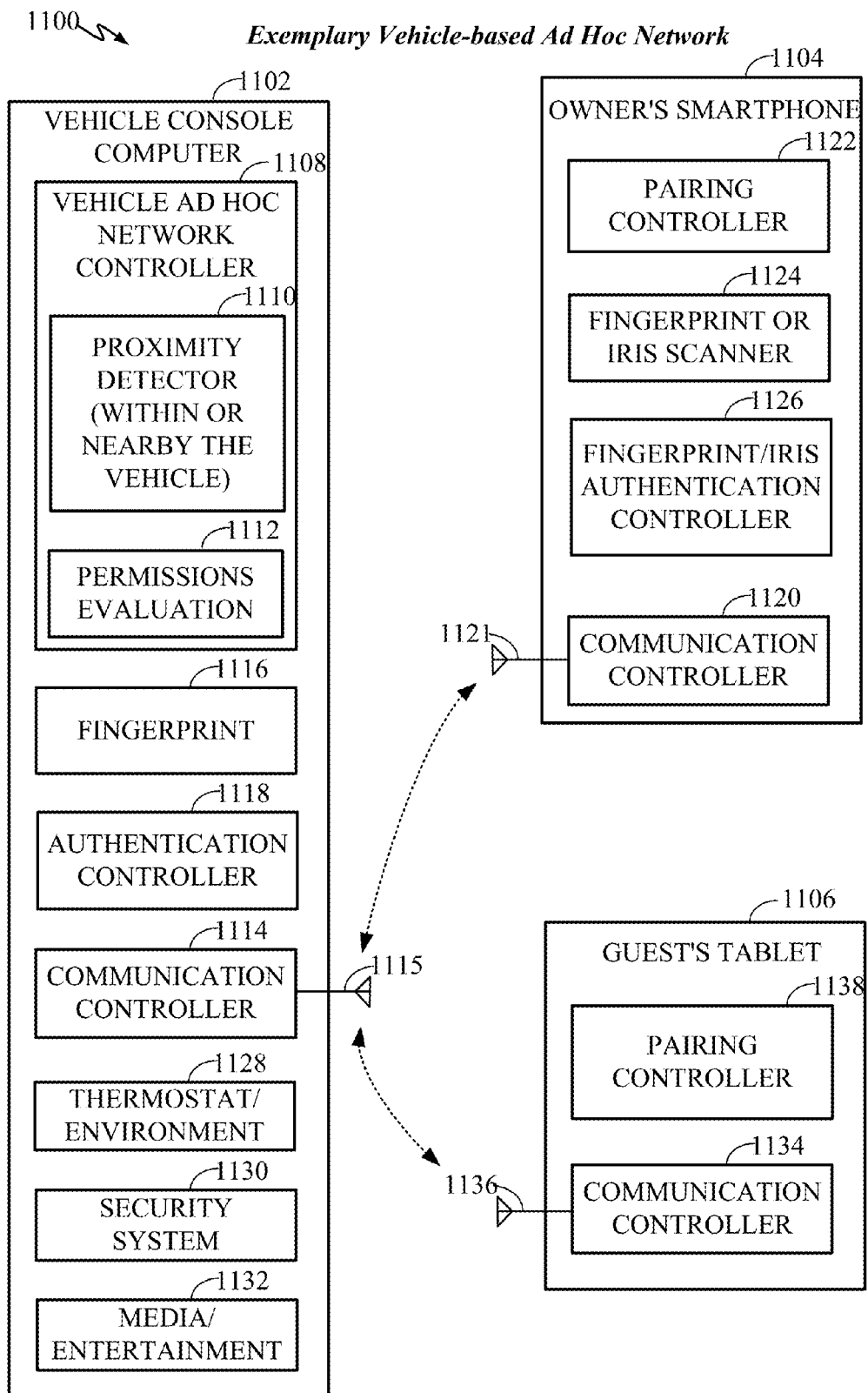
FIG. 11 is a block diagram of primary and secondary components an ad hoc network accordance with yet another an illustrative example where a vehicle console computer is the primary device of the network.

FIG. 11 illustrates selected components of devices within an exemplary vehicle-based ad hoc network 1100 where the primary device is a vehicle console computer 1102 and the secondary devices include an owner smartphone 1104 and a guest tablet 1106. Only those internal components pertinent to the ad hoc network are shown within the various devices. Some of the components are the same or similar to those shown in FIG. 10 and hence will not be described again in detail. Referring first to the vehicle console computer 1102, a vehicle ad hoc network controller 1108 controls the formation and termination of an ad hoc vehicle network using a proximity detector 1110 and a permissions controller 1112. The proximity controller detects any secondary devices in communication with the vehicle console computer 1102 via a communication controller 1114 (having an antenna 1115) such as by detecting devices within the vehicle or nearby. The communication controller 1114 may be a vehicle hotspot controller. Also, typically, the various secondary devices of the vehicle owner and family members are pre-registered so the vehicle console computer can automatically add or drop the devices from the ad hoc network as they are taken into and out of the vehicle over the course of a day, particularly if the vehicle is the family car.

Assuming a particular secondary device is within the vehicle and is pre-registered, such as owner's smartphone 1104, the secondary device is invited into the ad hoc network by sending suitable pairing signals. If the owner has not already been authenticated to the vehicle console computer 1102, a fingerprint scanner 1116 may be used, which is then authenticated via fingerprint authentication controller 1118. The aforementioned primary authentication value (and other data such as the device IDs for the various devices within the ad hoc network) may then be sent to the various secondary devices within the vehicle.

Owner's smartphone 1104 is shown as having a communication controller 1120 and an antenna 1121 for receiving signals from the home systems controller 1102 (either directly or via an intermediate communication network.) The owner's smartphone also includes a pairing controller 1122 that responds to any pairing signals received from the vehicle console computer 1102 and sends responsive handshake signals to join the ad hoc vehicle network. If secondary authentication is required with the owner's smartphone 1104 (as determined based, e.g., on permissions or rules received from the home systems controller), such secondary authorization may be performed using a camera 1124 and a facial recognition authorization controller 1126 and that performs the secondary authentication. Once paired with the vehicle console computer, the owner's smartphone can then be used to conveniently control various vehicle systems such as a thermostat and/or environment controller 1128, a security system 1130 and a vehicle media and entertainment system 1132. The guest's tablet 1106 includes similar components to that of the owner's smartphone 1104 but will be restricted from controlling vehicle systems. Briefly, the guest's tablet has a communication controller 1134, antenna 1136 and a pairing controller 1138. Although FIG. 11 only shows one smartphone and one tablet, additional or alternative secondary devices may form the vehicle ad hoc network, including various other full function mobile devices such as other tablets, game devices or other smartphones.

Figure 12:
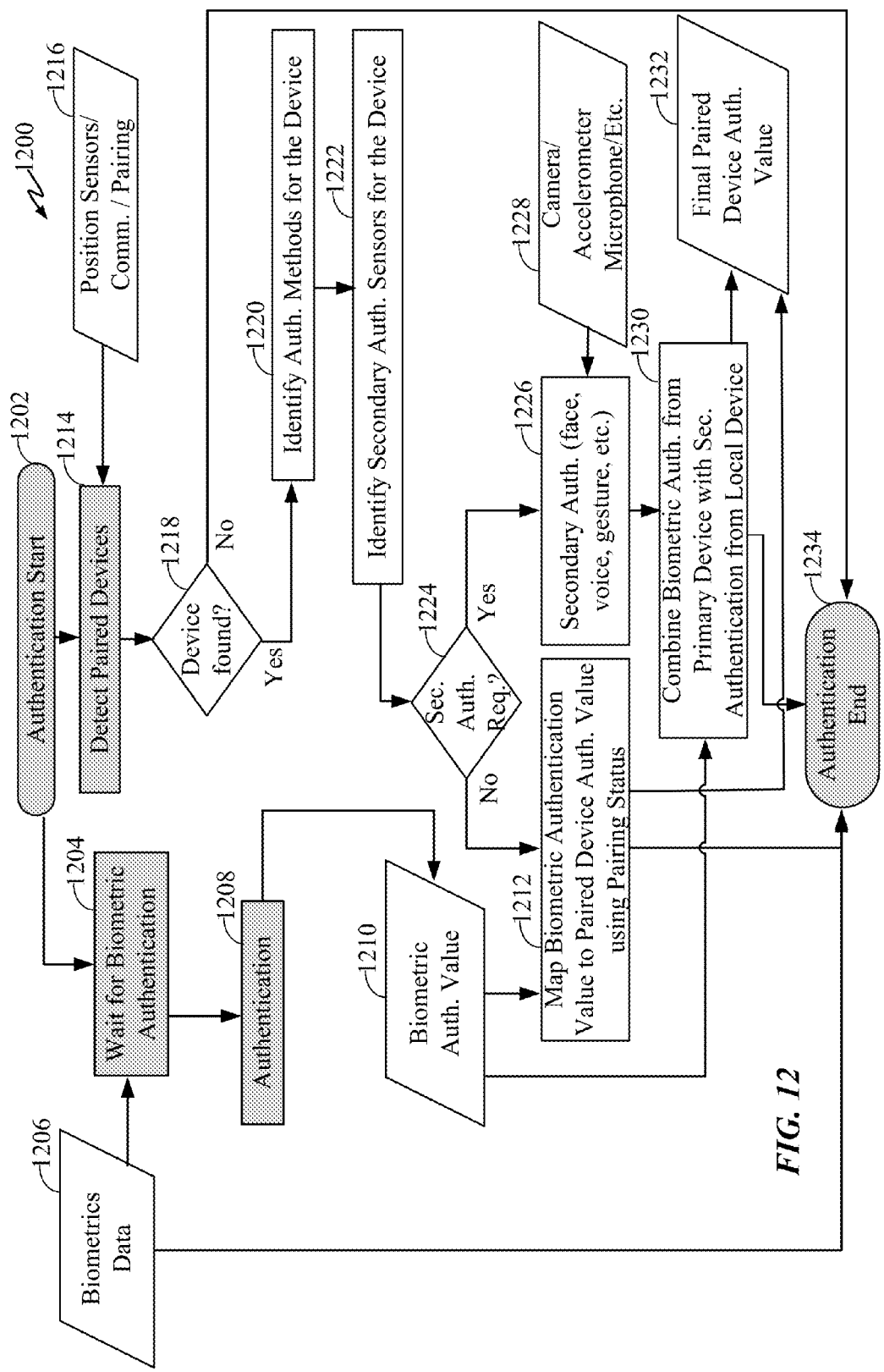
FIG. 12 illustrates further details of an exemplary method for authentication of a user of an ad hoc network.
Figure 13:
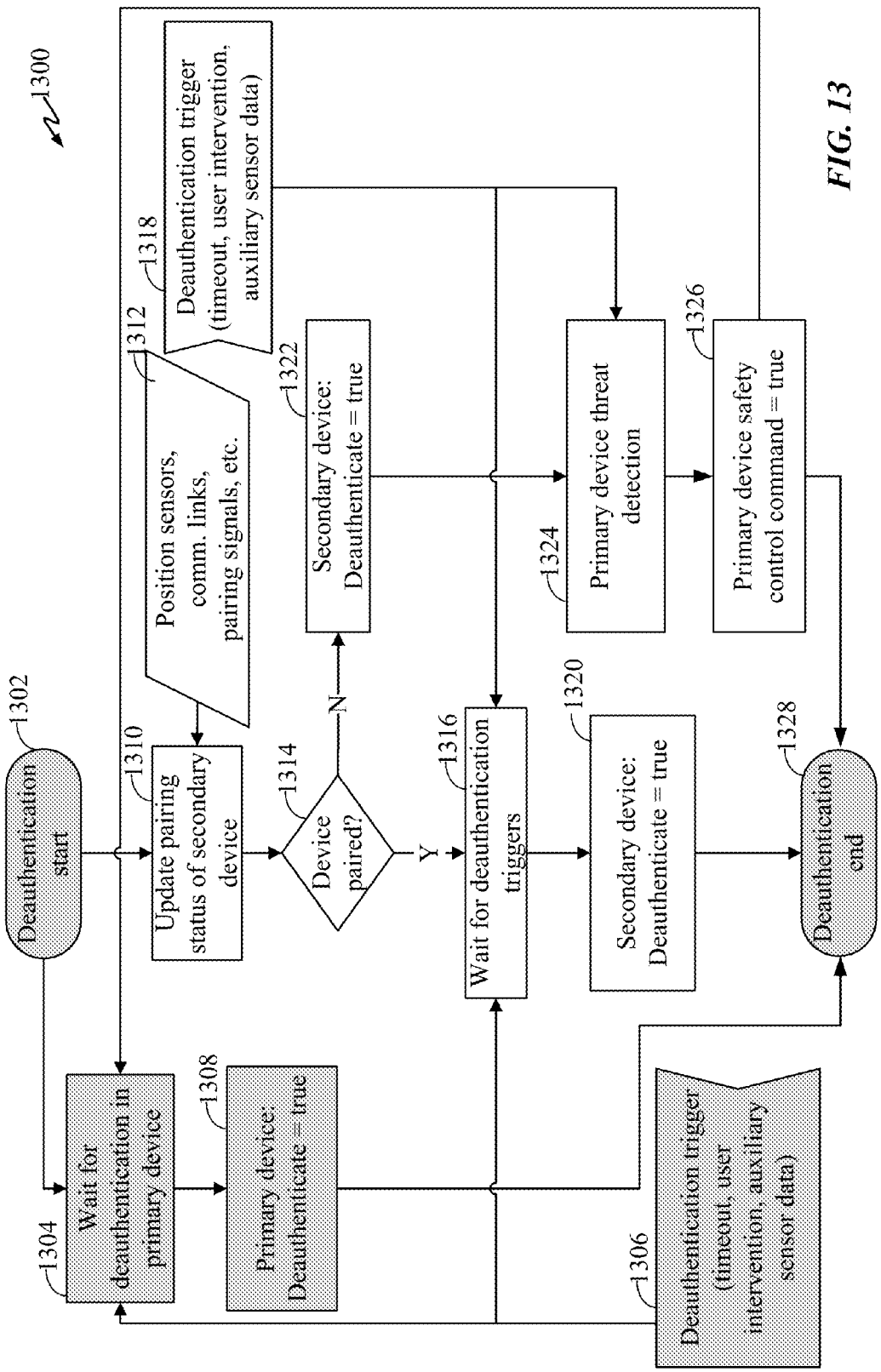
FIG. 13 illustrates further details of an exemplary method for deauthentication of a user of an ad hoc network.

Turning now to FIGS. 12 and 13, additional flowcharts illustrating operations of primary and secondary devices will be described. In these two flowcharts, operations of a primary device are shown with shaded blocks, whereas the operations of a secondary device are shown in unshaded blocks. At least some of the functions of the secondary device may instead be performed by the primary device, and vice versa, and hence the flowchart represents just one example of the manner by which functions can be distributed between primary and secondary devices.

FIG. 12 illustrates authentication procedures 1200. Authentication begins at 1202 followed by the primary device awaiting biometric authentication data 1204, which is received from biometric data block 1206. As already explained, the user may input biometric parameters via a fingerprint scanner or the like. The biometric parameters are stored with the device within a database such as shown by data block 1206. The primary device performs user authentication 1208 to generate a primary authentication value or trust level 1210. The biometric authentication value is mapped to a paired (i.e. secondary) device authentication value based on a pairing status 1212. The pairing status may simply indicate whether a particular secondary device is currently paired with the primary device via a prior pairing procedure 1214. That is, while the primary device is awaiting biometric data at 1204, the primary device also detects any paired devices 1214 based on data from position sensors, communication networks, etc., as already described above.

Assuming a paired secondary device is found 1218, then the paired device identifies one or more authentication methods for the paired device 1220, such as motion or facial recognition methods. The paired secondary device then identifies the corresponding secondary authentication sensors 1222 such an accelerometer for motion, a camera for images or a microphone for voice recognition. The paired secondary device also determines whether secondary authentication is required 1224 using techniques described above such as by examining permissions or rules received from the primary device. Assuming secondary authentication is required, then the paired device performs the secondary authentication 1226 based on data received from block 1228 such as camera, accelerometer or microphone data. The paired secondary device combines the biometric authentication from the primary device (via block 1210) with the secondary authentication from the paired (i.e. local) device 1230. The resulting combined value is stored as a final paired device authentication value 1232. Alternatively, if secondary authentication is not required at 1224, then the paired device instead proceeds through block 1212 to obtain the mapped authentication value (e.g., score or level) from block 1210, which is then stored as the final paired value. In either case, authentication ends 1234.

FIG. 13 illustrates deauthentication procedures 1300. Deauthentication begins 1302 with the primary device awaiting a primary deauthentication trigger 1304, which is received from deauthentication trigger block 1306. As already explained, such primary deauthentication triggers can involve timeouts, manual user intervention and data from auxiliary sensors (such as sensors indicating a difference in ambient noise or light among the devices of the ad hoc network.) Once a primary deauthentication trigger is received, the deauthentication status of the primary device is set to "true" 1308, i.e. the primary device is deauthenticated from the ad hoc network (and the ad hoc network itself is thereby terminated.) Concurrently, the secondary paired device updates its pairing status 1310 based on information received from position sensors, communication links, pairing signals, etc., 1312. Assuming the secondary device remains paired with the primary device, 1314, the secondary device awaits deauthentication triggers 1316. The deauthentication triggers received by the secondary device may include the same deauthentication triggers received by the primary device (via block 1306) and/or deauthentication triggers specific to the secondary device (via block 1318). Once a secondary deauthentication trigger is received, the deauthentication status of the secondary device is set to "true" 1320, i.e. the secondary device is deauthenticated from the ad hoc network (although the ad hoc network itself may continue with other secondary devices assuming the primary device is not also deauthenticated). Conversely, if the secondary device determines that it is no longer paired with the primary device 1314, then the deauthentication status of the secondary device is likewise set to "true" 1322, i.e. the secondary device is deauthenticated from the ad hoc network. Also, the secondary device can detect any threats to the primary device, 1324, such as the hacking or spoofing threats discussed above. If such a threat is detected, a primary device safety control command is set to "true" at 1326. This command is relayed to the primary device and represents one of the primary device deauthentication triggers of block 1304. Ultimately, deauthentication ends at 1328 following deauthentication of either a secondary device or both the secondary device and the primary device.

Further Exemplary Systems and Apparatus

Figure 14:
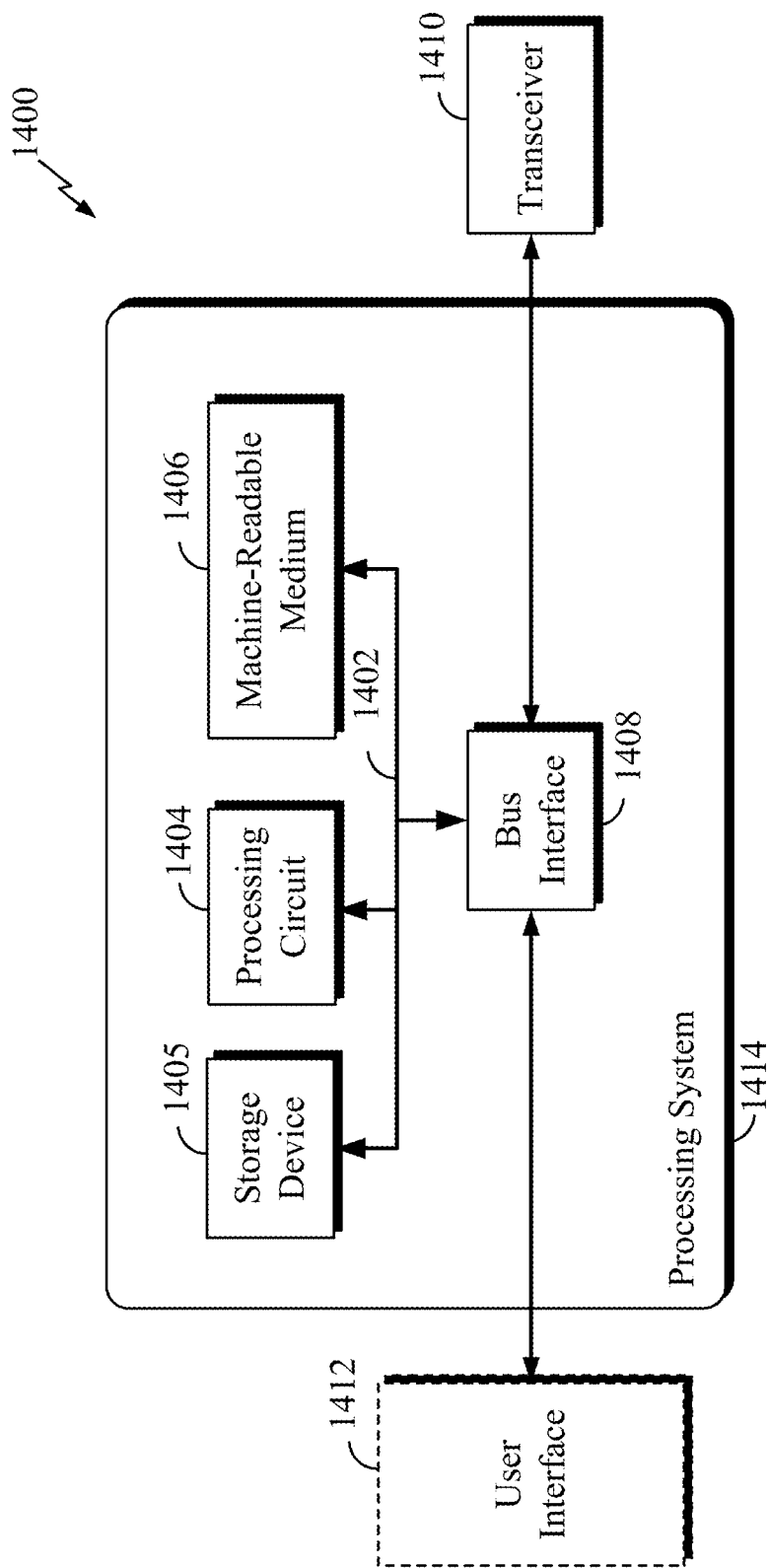
FIG. 14 is a block diagram illustrating an example of a hardware implementation for an apparatus employing a processing system of a primary device that may exploit the systems, methods and apparatus of FIGS. 2-13.

FIG. 14 illustrates an overall system or apparatus 1400 in which the primary device components and methods of FIGS. 2-13 may be implemented. In accordance with various aspects of the disclosure, an element, or any portion of an element, or any combination of elements may be implemented with a processing system 1414 that includes one or more processing circuits 1404 such as the SoC processing circuit of FIG. 5. For example, apparatus 1400 may be a user equipment (UE) of a mobile communication system. Apparatus 1400 may be used with a radio network controller (RNC). In addition to an SoC, examples of processing circuits 1404 include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, processing circuit 1404, as utilized in apparatus 1400, may be used to implement any one or more of the processes described above and illustrated in FIGS. 2-13 (and those illustrated in FIGS. 17 and 18, discussed below), such as processes to perform user authentication based on biometrics.

In this example, processing system 1414 may be implemented with a bus architecture, represented generally by the bus 1402. Bus 1402 may include any number of interconnecting buses and bridges depending on the specific application of processing system 1414 and the overall design constraints. Bus 1402 links together various circuits including one or more processing circuits (represented generally by the processing circuit 1404), storage device 1405, and a machine-readable, processing circuit-readable or computer-readable media (represented generally by a non-transitory machine-readable medium 1406.) Bus 1402 may also link various other circuits such as timing sources, peripherals, voltage regulators, and power management circuits, which are well known in the art, and therefore, will not be described any further. Bus interface 1408 provides an interface between bus 1402 and a transceiver 1410. Transceiver 1410 provides a means for communicating with various other apparatus over a transmission medium. Depending upon the nature of the apparatus, a user interface 1412 (e.g., keypad, display, speaker, microphone, joystick) may also be provided.

Processing circuit 1404 is responsible for managing bus 1402 and general processing, including the execution of software stored on the machine-readable medium 1406. The software, when executed by processing circuit 1404, causes processing system 1414 to perform the various functions described herein for any particular apparatus. The machine-readable medium 1406 may also be used for storing data that is manipulated by processing circuit 1404 when executing software.

One or more processing circuits 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1406. The machine-readable medium 1406 may be a non-transitory machine-readable medium. A non-transitory processing circuit-readable medium, processor-readable medium, machine-readable medium, or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a computer. The terms "machine-readable medium", "computer-readable medium", "processing circuit-readable medium", and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium," and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer. The machine-readable medium 1406 may reside in processing system 1414, external to processing system 1414, or distributed across multiple entities including processing system 1414. The machine-readable medium 1406 may be embodied in a computer program product. By way of example, a computer program product may include a processing circuit-readable medium in packaging materials. Those skilled in the art will recognize how best to implement the described functionality presented throughout this disclosure depending on the particular application and the overall design constraints imposed on the overall system.

In particular, the machine-readable storage medium 1406 may have one or more instructions which when executed by processing circuit 1404 causes the processing circuit to: obtain at least one biometric parameter representative of the user of the primary device; determine a primary authentication value representative of a degree of authentication of the user of the primary device based on the at least one biometric parameter; authenticate the user of the primary device based on the primary authentication value; and share the primary authentication value with a secondary device of the ad hoc network.

One or more of the components, steps, features, and/or functions illustrated in the figures may be rearranged and/or combined into a single component, step, feature or function or embodied in several components, steps, or functions. Additional elements, components, steps, and/or functions may also be added without departing from the features and aspects described. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Hence, in one aspect of the disclosure, processing circuit 500 and/or 1404 illustrated in FIGS. 5 and 14, respectively, may be a specialized processing circuit (e.g., an ASIC)) that is specifically designed and/or hard-wired to perform the algorithms, methods, and/or steps described in FIGS. 4, 7, 8, 12 and/or 13 (and/or FIGS. 17 and 18, discussed below.) Thus, such a specialized processing circuit (e.g., ASIC) may be one example of a means for executing the algorithms, methods, and/or steps described in FIGS. 4, 7, 8, 12 and/or 13 (and/or FIGS. 17 and 18, discussed below.) The machine-readable storage medium may store instructions that when executed by a specialized processing circuit (e.g., ASIC) causes the specialized processing circuit to perform the algorithms, methods, and/or steps described herein.

Figure 15:
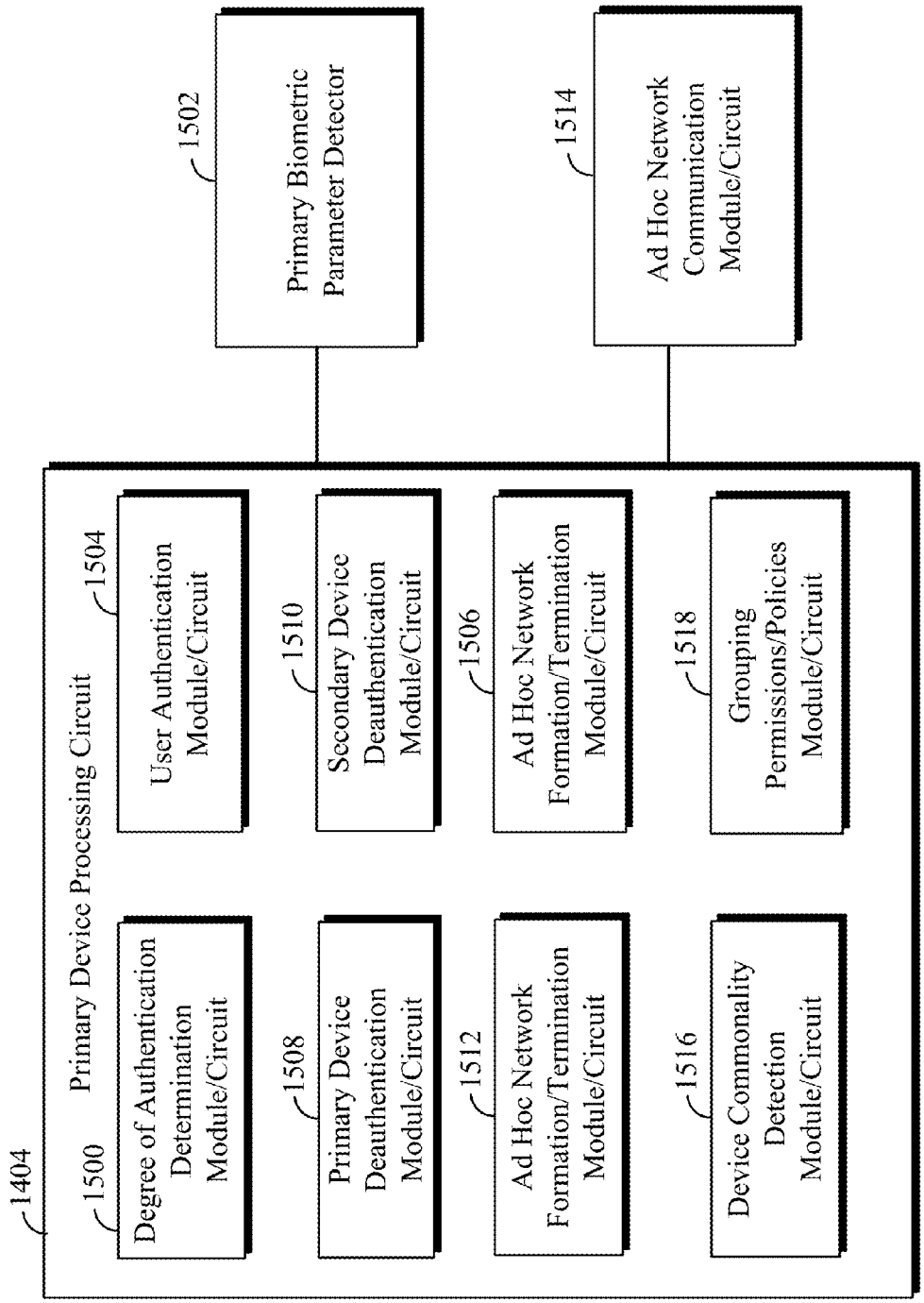
FIG. 15 is a block diagram illustrating components of the processing circuit of the primary device FIG. 14.

FIG. 15 illustrates selected and exemplary components of processing circuit 1404 of a primary device of an ad hoc network. In particular, processing circuit 1404 of FIG. 15 includes a degree of authentication determination module/circuit 1500 configured to determine a primary authentication value representative of a degree of authentication of the user of the primary device based on the at least one biometric parameter. The biometric parameter may be detected by a primary biometric parameter detector 1502, which is configured to obtain at least one biometric parameter representative of the user of the primary device. Processing circuit 1404 also includes: a user authentication module/circuit 1504 configured to authenticate the user of the primary device based on the primary authentication value; a primary authentication sharing module/circuit 1506 configured to share the primary authentication value with a secondary device of the ad hoc network via an ad hoc network communication module/circuit 1514; and a primary device deauthentication module/circuit 1508 configured to detect a trigger for deauthenticating the user of the primary device and, in response, deauthenticating the user of the primary device and the secondary device of the ad hoc network wherein the trigger for deauthenticating the user of the primary device can include at least one of: (a) a user initiated primary device deauthentication, (b) a primary device timeout, or (c) a primary device threat indication representative of a security compromise of the primary device.

Processing circuit 1404 also includes: a secondary device deauthentication module/circuit 1510 configured to detect a trigger for deauthenticating the user of the secondary device and, in response, sending a signal to the secondary device to deauthenticate the user of the secondary device, wherein the trigger for deauthenticating the user of the secondary device includes at least one of: (a) a user initiated secondary device deauthentication, (b) a secondary device timeout, (c) a secondary device threat indication representative of a security compromise of the secondary device, (d) a loss of communication with the secondary device, (e) a loss of commonality between the primary device and the secondary device, or (f) a violation of a predetermined permission policy. Processing circuit 1404 also includes: an ad hoc network formation/termination module/circuit 1512 configured to form and subsequently terminate an ad hoc network based on signals sent and received via the ad hoc network communication module/circuit 1514; a device commonality detection module/circuit 1516 configured to detect a loss of commonality between the primary device and the secondary device based a loss of commonality in one or more of ambient noise, ambient light, location, motion and a shared communication link; and a grouping permissions/polices module/circuit 1518 configured to manage ad hoc network permissions and policies. Other components may be provided as well and the illustration of FIG. 15 is by no means exhaustive.

Figure 16:
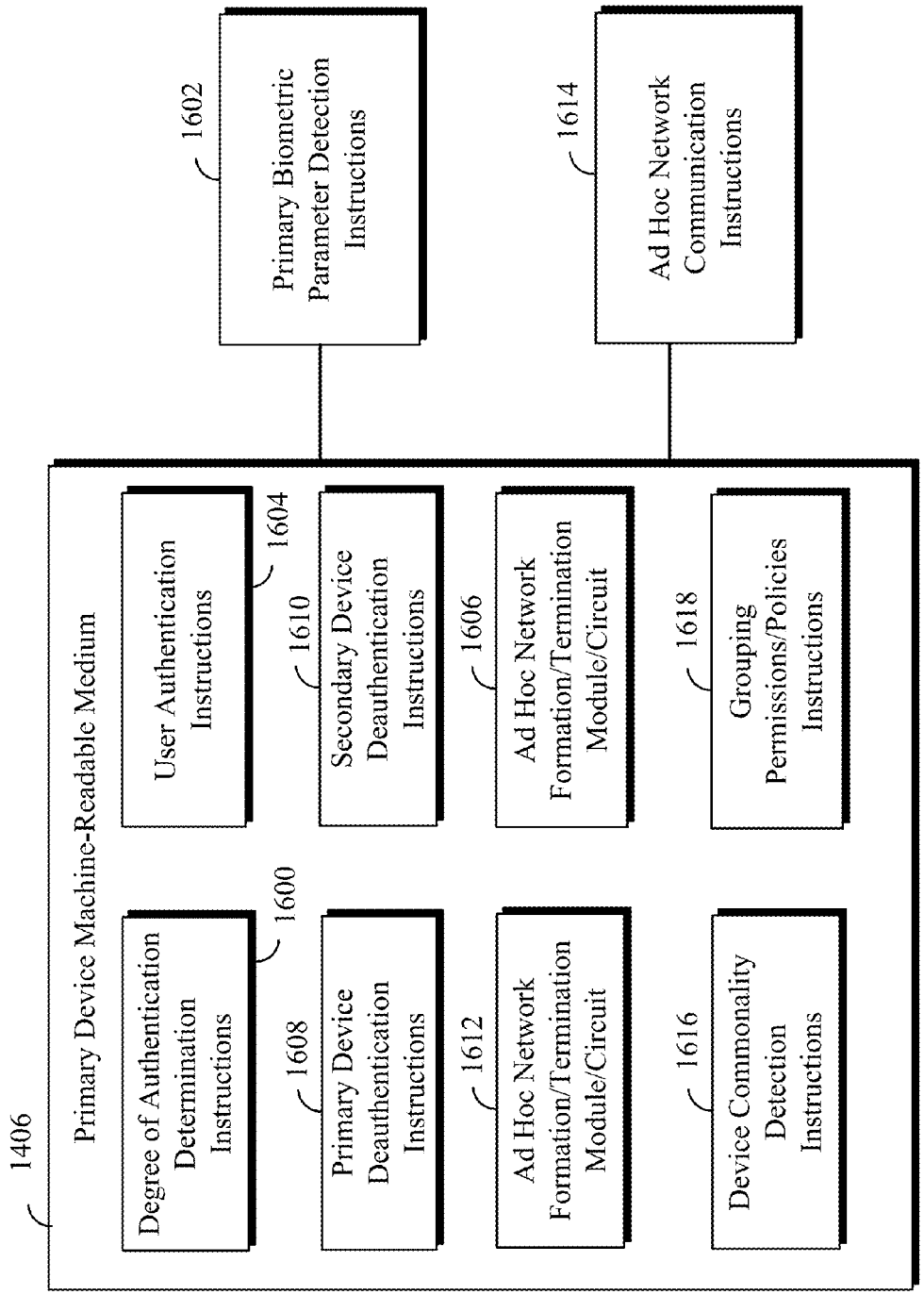
FIG. 16 is a block diagram illustrating instruction components of the machine-readable medium of the primary device of FIG. 14.

FIG. 16 illustrates selected and exemplary instruction components of the machine-readable or computer-readable medium 1406. In particular, machine-readable medium 1406 of FIG. 16 includes degree of authentication determination instructions 1600, which when executed by the processing circuit of FIG. 15, causes the processing circuit to determine a primary authentication value representative of a degree of authentication of the user of the primary device based on the at least one biometric parameter. The biometric parameter may be detected using primary biometric parameter detection instructions 1602, which are configured/operative to obtain at least one biometric parameter representative of the user of the primary device. Machine-readable medium 1406 also includes: a user authentication instructions 1604 configured/operative to authenticate the user of the primary device based on the primary authentication value; primary authentication sharing instructions 1606 configured/operative to share the primary authentication value with a secondary device of the ad hoc network via ad hoc network communication instructions 1614; and primary device deauthentication instructions 1608 configured/operative to detect a trigger for deauthenticating the user of the primary device and, in response, deauthenticating the user of the primary device and the secondary device of the ad hoc network wherein the trigger for deauthenticating the user of the primary device can include at least one of: (a) a user initiated primary device deauthentication, (b) a primary device timeout, or (c) a primary device threat indication representative of a security compromise of the primary device.

Machine-readable medium 1406 also includes secondary device deauthentication instructions 1610 configured/operative to detect a trigger for deauthenticating the user of the secondary device and, in response, sending a signal to the secondary device to deauthenticate the user of the secondary device, wherein the trigger for deauthenticating the user of the secondary device includes at least one of: (a) a user initiated secondary device deauthentication, (b) a secondary device timeout, (c) a secondary device threat indication representative of a security compromise of the secondary device, (d) a loss of communication with the secondary device, (e) a loss of commonality between the primary device and the secondary device, or (f) a violation of a predetermined permission policy. Machine-readable medium 1406 also includes: ad hoc network formation/termination instructions 1612 configured/operative to form and subsequently terminate an ad hoc network based on signals sent and received via the ad hoc network communication instructions 1614; device commonality detection instructions 1616 configured/operative to detect a loss of commonality between the primary device and the secondary device based a loss of commonality in at least one of ambient noise, ambient light, location, motion, or a shared communication link; and grouping permissions/polices instructions 1618 configured/operative to manage ad hoc network permissions and policies. Other instruction may be provided as well and the illustration of FIG. 16 is by no means exhaustive.

Figure 17:
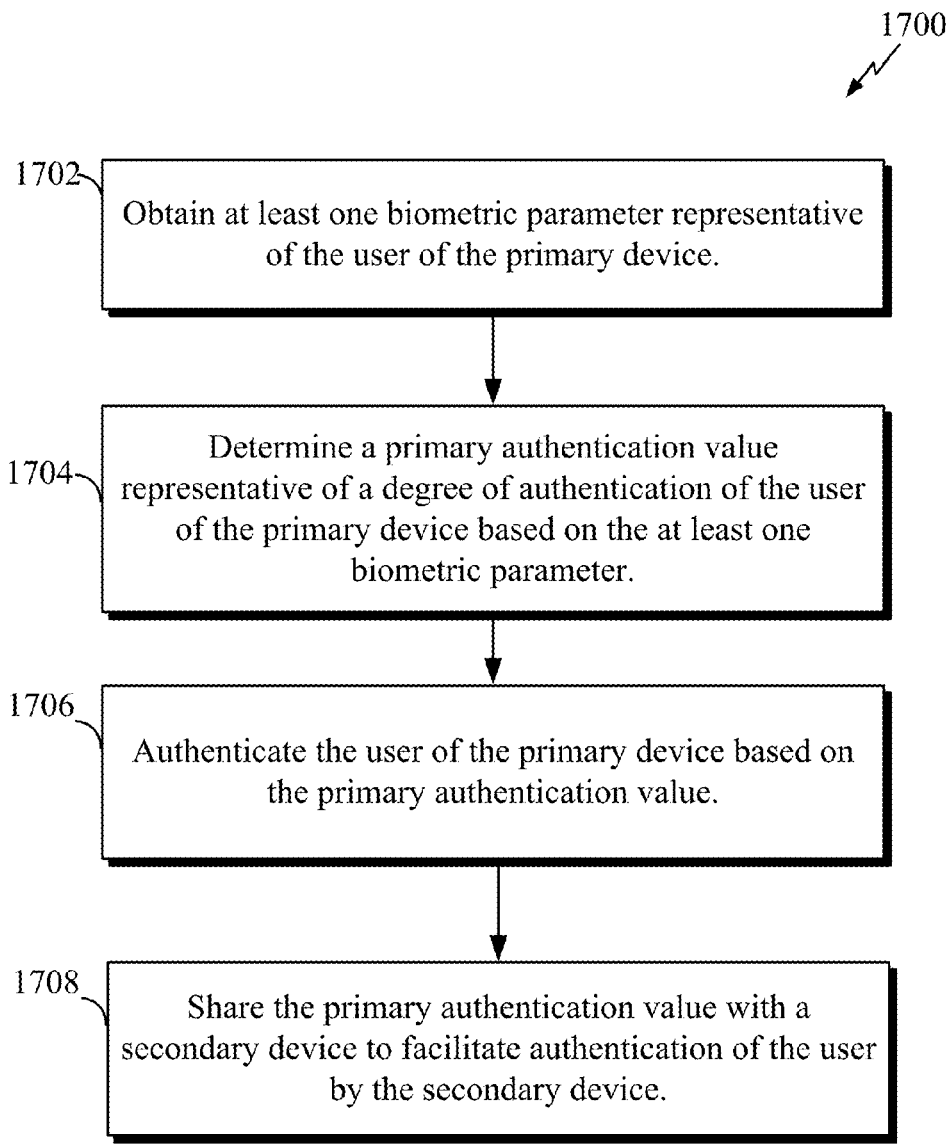
FIG. 17 summarizes an exemplary method for use by a primary device of an ad hoc network for authentication of a user.

FIG. 17 broadly illustrates and summarizes methods or procedures 1700 that may be performed by processing circuit 1404 of FIGS. 14 and 15 or other suitably equipped devices for use by a primary device for authentication of a user. At 1702, the processing circuit obtains at least one biometric parameter representative of the user of the primary device and, at 1704, determines a primary authentication value representative of a degree of authentication of the user of the primary device based on the at least one biometric parameter. At 1706, the processing circuit authenticates the user of the primary device based on the primary authentication value and, at 1708, shares the primary authentication value with a secondary device (e.g., via an ad hoc network) to facilitate authentication of the user by the secondary device.

FIG. 18 broadly illustrates and summarizes further methods or procedures 1800 that may be performed by processing circuit 1404 of FIGS. 14 and 15 or other suitably equipped devices for use by a primary device of an ad hoc network for authentication of a user. The processing circuit may invite/disinvite secondary devices to/from the ad hoc network based on commonality (or lack thereof) in at least one of ambient noise, ambient light, location, motion, or a shared communication links 1802. The processing circuit forwards one or more of permissions and policies to one or more secondary devices along with the primary authentication value, which may be an authentication value (e.g., score or trust level) 1804. The processing circuit may detect a trigger for deauthenticating the user of the primary device and, in response, deauthenticates the user of the primary device and all secondary devices of the ad hoc network, wherein the trigger for deauthenticating the user of the primary device includes one or more of a user initiated primary device deauthentication, a primary device timeout and a primary device threat indication representative of a security compromise of the primary device 1806. The processing circuit detects a trigger for deauthenticating the user of a secondary device and, in response, sends signals to the secondary device to deauthenticate the user of the secondary device, wherein the trigger for deauthenticating the user of the secondary device includes one or more of a user initiated secondary device deauthentication, a secondary device timeout, a secondary device threat indication representative of a security compromise of the secondary device, a loss of communication with the secondary device, a loss of commonality between the primary device and the secondary device and a violation of a predetermined permission or policy 1808.

Figure 19:
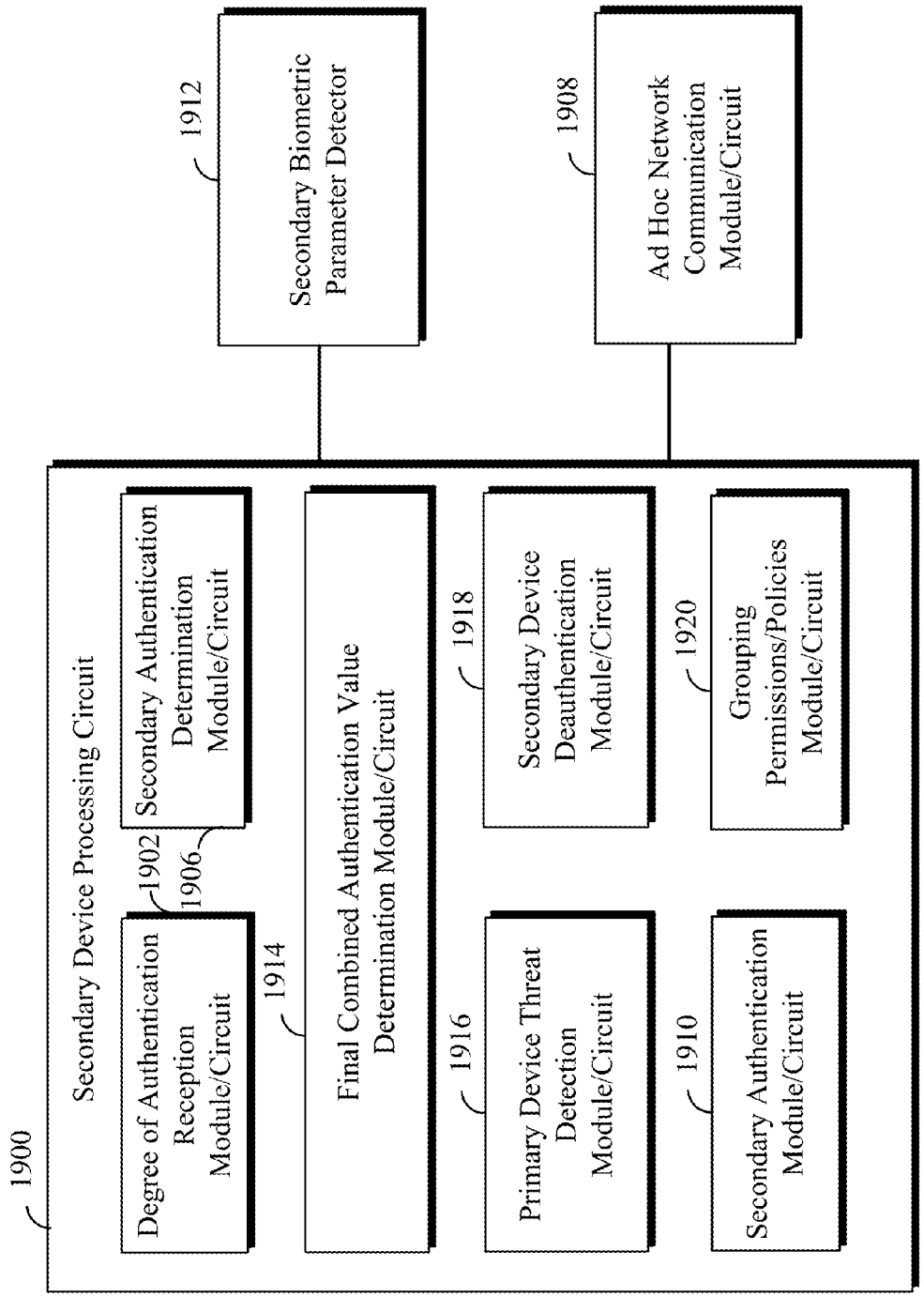
FIG. 19 is a block diagram illustrating components of the processing circuit of a secondary device of an ad hoc network.

FIG. 19 illustrates selected and exemplary components of processing circuit 1900 of a secondary device of an ad hoc network (which may have an architecture similar to that of the primary device of FIG. 14.) In particular, processing circuit 1900 of FIG. 19 includes a degree of authentication reception module/circuit 1902 configured to receive and process a primary authentication value representative of a degree of authentication of the user of the primary device received from the primary device using an ad hoc network communication module/circuit 1908. A secondary authentication determination module/circuit 1906 is configured to determine whether to perform a secondary authentication of the user. If so, the secondary authentication is performed or controlled by a secondary authentication module/circuit 1910, which is configured to obtain at least one biometric parameter using a secondary biometric parameter detector 1912 representative of the user of the secondary device and to determine a secondary authentication value representative of a degree of authentication of the user of the secondary device based on the at least one biometric parameter obtained using the secondary device. A final combined authentication value determination module/circuit 1914 is configured to combine the primary authentication value received from the primary device with the secondary authentication value to yield a combined authentication value. The secondary authentication module/circuit 1910 then authenticates the user of secondary device using the combined authentication value.

Processing circuit 1900 also includes a primary device deauthentication detection module/circuit 1916 configured to detect a primary device threat indication at the secondary device and to control sending a signal to the primary device to deauthenticate the user of the primary device (using communication module/circuit 1908.) Processing circuit 1900 also includes a secondary device deauthentication module/circuit 1918 configured to detect a trigger for deauthenticating the user of the secondary device and, in response, deauthenticate the user of the secondary device and notifying the primary device, wherein the trigger for deauthenticating the user of the secondary device includes one or more of a user initiated secondary device deauthentication, a secondary device timeout, a secondary device threat indication representative of a security compromise of the secondary device and a primary device threat indication representative of a security compromise of the primary device. Processing circuit 1900 also includes a grouping permissions/polices module/circuit 1920 configured to manage ad hoc network permissions and policies on behalf of the secondary device. Other components may be provided as well and the illustration of FIG. 19 is by no means exhaustive.

Figure 20:
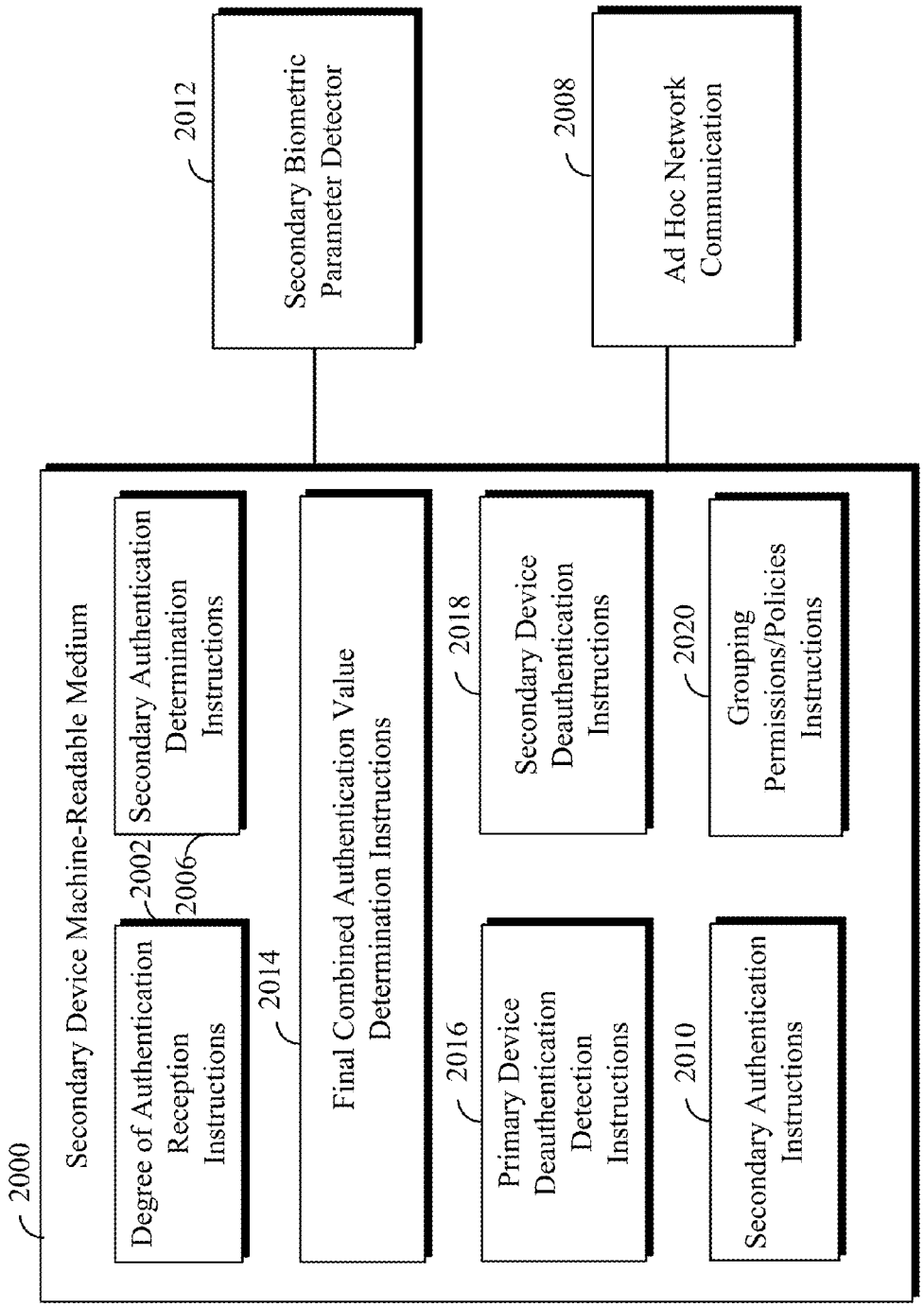
FIG. 20 is a block diagram illustrating instruction components of the machine-readable medium of the secondary device of an ad hoc network.

FIG. 20 illustrates selected and exemplary instruction components of a machine-readable medium 2000 of a secondary device. In particular, machine-readable medium 2000 of FIG. 20 includes degree of authentication reception instructions 2002, which when executed by a processing circuit of the secondary device, cause the processing circuit to receive and process a primary authentication value representative of a degree of authentication of the user of the primary device received from the primary device using an ad hoc network communication instructions 2008. Secondary authentication determination instructions 2006 are configured/operative to determine whether to perform a secondary authentication of the user. If so, the secondary authentication is performed or controlled by secondary authentication instructions 2010, which are operative to obtain at least one biometric parameter using a secondary biometric parameter detector 2012 representative of the user of the secondary device and to determine a secondary authentication value representative of a degree of authentication of the user of the secondary device based on the at least one biometric parameter obtained using the secondary device. Final combined authentication value determination instructions 2014 are configured/operative to combine the primary authentication value received from the primary device with the secondary authentication value to yield a combined authentication value. The secondary authentication instructions 2010 then authenticate the user of secondary device using the combined authentication value.

Machine-readable medium 2000 also includes primary device deauthentication detection instructions 2016 configured/operative to detect a primary device threat indication at the secondary device and to control sending a signal to the primary device to deauthenticate the user of the primary device. Medium 2000 also includes secondary device deauthentication instructions 2018 configured/operative to detect a trigger for deauthenticating the user of the secondary device and, in response, to deauthenticate the user of the secondary device and notify the primary device, wherein the trigger for deauthenticating the user of the secondary device includes one or more of a user initiated secondary device deauthentication, a secondary device timeout, a secondary device threat indication representative of a security compromise of the secondary device and a primary device threat indication representative of a security compromise of the primary device. Medium 2000 also includes grouping permissions/polices instructions 2020 configured/operative to manage ad hoc network permissions and policies on behalf of the secondary device. Other instructions may be provided as well and the illustration of FIG. 20 is by no means exhaustive.

Figure 21:
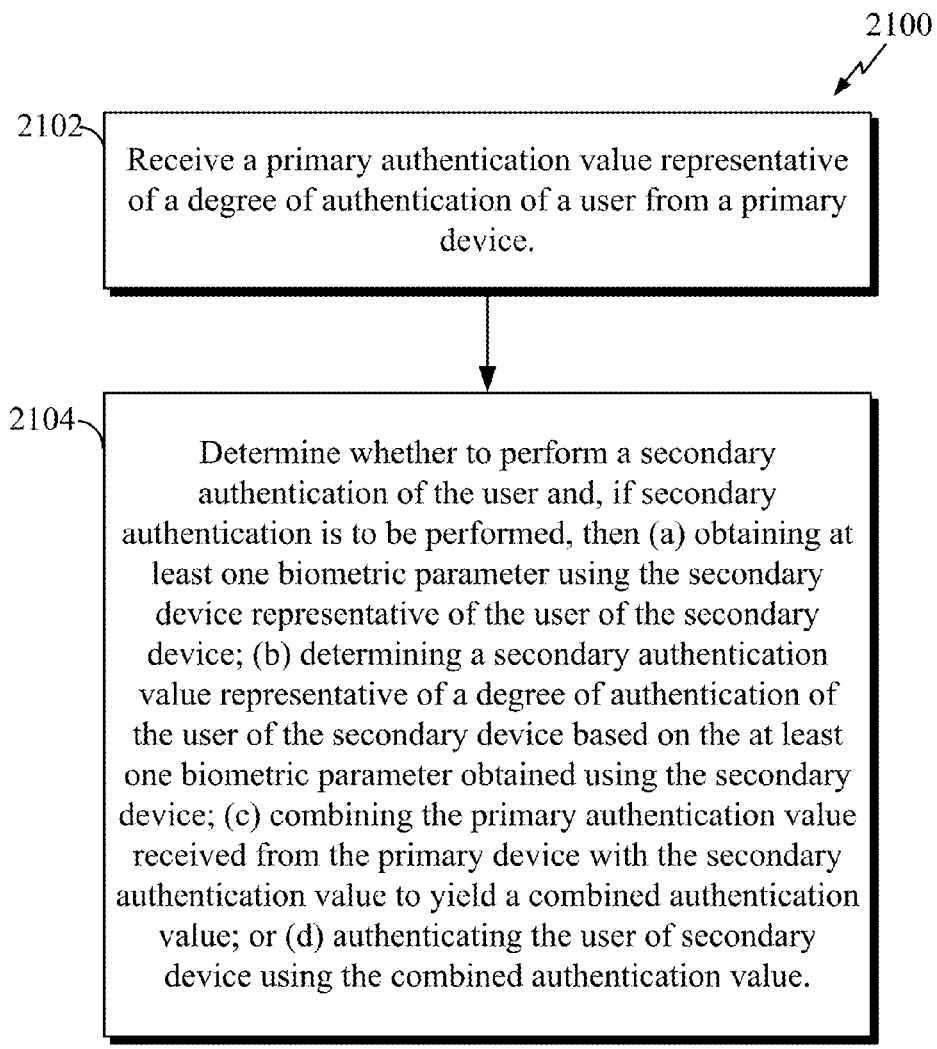
FIG. 21 summarizes an exemplary method for use by a secondary device of an ad hoc network for authentication of a user.

FIG. 21 broadly illustrates and summarizes methods or procedures 2100 that may be performed by processing circuit 1900 of FIG. 19 or other suitably equipped devices for use by a secondary device for authentication of a user. The processing circuit receives a primary authentication value representative of a degree of authentication of a user (of the secondary device) from a primary device (e.g., via an ad hoc wireless network) 2102. The processing circuit determines whether to perform a secondary authentication of the user and, if so, then (a) obtains at least one biometric parameter using the secondary device representative of the user; (b) determines a secondary authentication value representative of a degree of authentication of the user of the secondary device based on the at least one biometric parameter obtained using the secondary device; (c) combines the primary authentication value received from the primary device with the secondary authentication value to yield a combined authentication value; and (d) authenticates the user of secondary device using the combined authentication value 2104.

Figure 22:
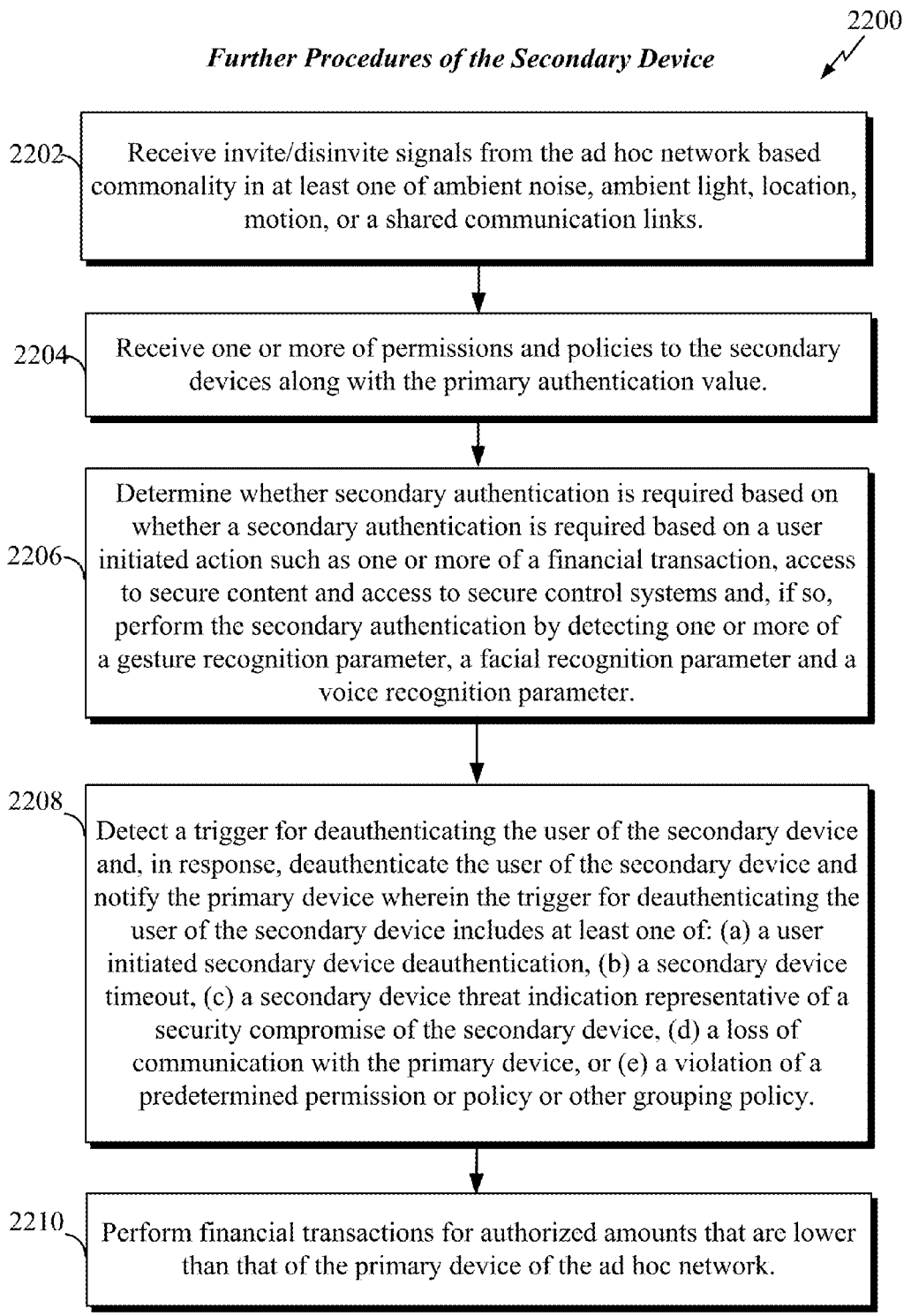
FIG. 22 summarizes further aspects of an exemplary method for use by a secondary device of an ad hoc network for authentication of a user.

FIG. 22 broadly illustrates and summarizes further methods or procedures 2200 that may be performed by processing circuit 1900 of FIG. 19 or other suitably equipped devices for use by a secondary device of an ad hoc network for authentication of a user. The processing circuit receives invite/disinvite signals from the ad hoc network based on commonality in at least one of ambient noise, ambient light, location, motion or a shared communication links 2202 and, receives one or more of permissions and policies to the secondary devices along with the primary authentication value 2204. The processing circuit determines whether secondary authentication is required based on whether a secondary authentication is required based on a user initiated action such as one or more of a financial transaction, access to secure content and access to secure control systems and, if so, perform the secondary authentication by detecting one or more of a gesture recognition parameter, a facial recognition parameter and a voice recognition parameter 2206. The processing circuit detects a trigger for deauthenticating the user of the secondary device and, in response, deauthenticates the user of the secondary device and notify the primary device wherein the trigger for deauthenticating the user of the secondary device includes one or more of a user initiated secondary device deauthentication, a secondary device timeout, a secondary device threat indication representative of a security compromise of the secondary device, a loss of communication with the primary device and a violation of a predetermined permission or policy or other grouping policy 2208. The processing circuit performs financial transactions for authorized amounts that are lower than that of the primary device of the ad hoc network 2210.

It is noted that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It is contemplated that various features described herein may be implemented in different systems. It should be noted that the foregoing aspects of the disclosure are merely examples and are not to be construed as limiting. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational by a primary device for authentication of a user, comprising: obtaining at least one biometric parameter representative of the user of the primary device using a biometric parameter detector of the primary device; determining a primary authentication value representative of a degree of authentication of the user of the primary device based on the at least one biometric parameter, wherein the primary authentication value indicates a degree of match within a range of values between the biometric parameter and corresponding features of an authorized user of the primary device; authenticating the user of the primary device based on the primary authentication value by comparing the primary authentication value with a threshold; and sharing the primary authentication value with a secondary device equipped with a secondary biometric parameter detector to facilitate authentication of the user by the secondary device using the secondary biometric parameter detector.

2. The method of claim 1, wherein the primary authentication value representative of the degree of authentication of the user is at least one of: (a) an authentication score, or (b) a trust level.

3. The method of claim 1, further including detecting a trigger for deauthenticating the user of the primary device and, in response, deauthenticating the user of the primary device and the secondary device.

4. The method of claim 3, wherein the trigger for deauthenticating the user of the primary device includes at least one of: (a) a user initiated primary device deauthentication, (b) a primary device timeout, or (c) a primary device threat indication representative of a security compromise of the primary device.

5. The method of claim 1, further including detecting a trigger for deauthenticating the user of the secondary device and, in response, sending a signal to the secondary device to deauthenticate the user of the secondary device.

6. The method of claim 5, wherein the trigger for deauthenticating the user of the secondary device includes at least one of: (a) a user initiated secondary device deauthentication, (b) a secondary device timeout, (c) a secondary device threat indication representative of a security compromise of the secondary device, (d) a loss of communication with the secondary device, (e) a loss of commonality between the primary device and the secondary device, or (f) a violation of a predetermined permission policy.

7. The method of claim 5, wherein the trigger for deauthenticating the user of the secondary device includes a loss of commonality between the primary device and the secondary device in at least one of location, motion, or a shared communication link.

8. The method of claim 5, wherein the trigger for deauthenticating the user of the secondary device includes a loss of commonality between the primary device and the secondary device in at least one of ambient noise or ambient light.

9. The method of claim 1, wherein the primary device and secondary device communicate via an ad hoc wireless network.

10. The method of claim 1, wherein the threshold is indicative of a sufficient degree of authentication.

11. A primary device, comprising: a biometric parameter detector configured to obtain at least one biometric parameter representative of a user of the primary device; a transmitter; and a processing circuit coupled to the biometric parameter detector and the transmitter, the processing circuit configured to determine a primary authentication value representative of a degree of authentication of the user of the primary device based on the at least one biometric parameter, wherein the primary authentication value indicates a degree of match within a range of values between the biometric parameter and corresponding features of an authorized user of the primary device, authenticate the user of the primary device based on the primary authentication value by comparing the primary authentication value with a threshold, and share the primary authentication value with a secondary device equipped with a secondary biometric parameter detector using the transmitter to facilitate authentication of the user by the secondary device using the secondary biometric parameter detector.

12. The primary device of claim 11, wherein the value representative of the degree of authentication of the user is at least one of: (a) an authentication score, or (b) a trust level.

13. The primary device of claim 11, wherein the processing circuit is further configured to detect a trigger for deauthenticating the user of the primary device and, in response, to deauthenticate the user of the primary device and the secondary device.

14. The primary device of claim 13, wherein the trigger for deauthenticating the user of the primary device includes at least one of: (a) a user initiated primary device deauthentication, (b) a primary device timeout, or (c) a primary device threat indication representative of a security compromise of the primary device.

15. The primary device of claim 11, wherein the processing circuit is further configured to detect a trigger for deauthenticating the user of the secondary device and, in response, to send a signal to the secondary device using the transmitter to deauthenticate the user of the secondary device.

16. The primary device of claim 15, wherein the trigger for deauthenticating the user of the secondary device includes at least one of: (a) a user initiated secondary device deauthentication, (b) a secondary device timeout, (c) a secondary device threat indication representative of a security compromise of the secondary device, (d) a loss of communication with the at least one secondary device, (e) a loss of commonality between the primary device and the secondary device, or (f) a violation of a predetermined permission policy.

17. The primary device of claim 15, wherein the trigger for deauthenticating the user of the secondary device includes a loss of commonality between the primary device and the secondary device in at least one of location, motion, or a shared communication link.

18. The primary device of claim 15, wherein the trigger for deauthenticating the user of the secondary device includes a loss of commonality between the primary device and the secondary device in at least one of ambient noise or ambient light.

19. The primary device of claim 11, wherein the primary device and secondary device communicate via an ad hoc wireless network.

20. The primary device of claim 11:
    (a) wherein the primary device is a control computer of a vehicle and the secondary device is a mobile device in proximity to the vehicle;
    (b) wherein the primary device is a control computer of a building and the secondary device is a mobile device in proximity to the building; or
    (c) wherein the primary device is a smartphone and the secondary device is at least one of a smartwatch, a pair of smartglasses, a mobile health monitor, or an article of smartclothing.

21. The primary device of claim 11, wherein the threshold is indicative of a sufficient degree of authentication.

22. A method operational by a secondary device for authentication of a user of the secondary device, comprising:
    receiving a primary authentication value representative of a degree of authentication of the user from a primary device, wherein the primary authentication value indicates a degree of match within a range of values between the biometric parameter and corresponding features of an authorized user of the primary device; and
    determining whether to perform a secondary authentication of the user and then performing the secondary authentication by
    (a) obtaining at least one biometric parameter representative of the user using the secondary device using a biometric parameter detector of the secondary device,
    (b) determining a secondary authentication value representative of a degree of authentication of the user based on the at least one biometric parameter obtained using the secondary device,
    (c) combining the primary authentication value received from the primary device with the secondary authentication value to yield a combined authentication value, and
    (d) authenticating the user of the secondary device using the combined authentication value by comparing the combined authentication value with a threshold.

23. The method of claim 22, further including detecting a trigger for deauthenticating the user of the secondary device and, in response, deauthenticating the user of the secondary device and notifying the primary device.

24. The method of claim 23, wherein the trigger for deauthenticating the user of the secondary device includes at least one of: (a) a user initiated secondary device deauthentication, (b) a secondary device timeout, (c) a secondary device threat indication representative of a security compromise of the secondary device, or (d) a primary device threat indication representative of a security compromise of the primary device.

25. The method of claim 22, further including detecting a primary device threat indication at the secondary device and sending a signal to the primary device to deauthenticate the user of the primary device.

26. The method of claim 22, wherein obtaining at least one biometric parameter using the secondary device includes detecting one of more of a gesture recognition parameter, a facial recognition parameter, and a voice recognition parameter.

27. The method of claim 22, wherein the primary device and the secondary device are authorized to perform financial transactions and wherein the secondary device is authorized to perform financial transactions only for lesser amounts than the primary device is authorized to perform.

28. The method of claim 22, wherein the secondary device determines whether the secondary authentication is required based on a user initiated action.

29. The method of claim 28, wherein the user initiated action includes at least one of: (a) a financial transaction, (b) access to secure content, or (c) access to secure control systems.

30. The method of claim 22, wherein the threshold is indicative of a sufficient degree of authentication.

31. A secondary device, comprising:
    a receiver operative to receive a primary authentication value representative of a degree of authentication of a user from a primary device, wherein the primary authentication value indicates a degree of match within a range of values between the biometric parameter and corresponding features of an authorized user of the primary device;
    a biometric parameter detector; and
    a processing circuit coupled to the receiver and the biometric parameter detector, the processing circuit operative to determine whether to perform a secondary authentication of the user and further operative perform the secondary authentication to
    (a) obtain at least one biometric parameter representative of the user of the secondary device using the biometric parameter detector,
    (b) determine a secondary authentication value representative of a degree of authentication of the user based on the at least one biometric parameter,
    (c) combine the primary authentication value received from the primary device with the secondary authentication value to yield a combined authentication value, and
    (d) authenticate the user of the secondary device using the combined authentication value by comparing the combined authentication value with a threshold.

32. The secondary device of claim 31, wherein the processing circuit is further operative to detect a trigger for deauthenticating the user of the secondary device and, in response, to deauthenticate the user of the secondary device and notify the primary device.

33. The secondary device of claim 32, wherein the trigger for deauthenticating the user of the secondary device includes at least one of: (a) a user initiated secondary device deauthentication, (b) a secondary device timeout, (c) a secondary device threat indication representative of a security compromise of the secondary device, or (d) a primary device threat indication representative of a security compromise of the primary device.

34. The secondary device of claim 31, wherein the biometric parameter detector is operative to obtain at least one biometric parameter using the secondary device by detecting at least one of: a gesture recognition parameter, a facial recognition parameter, or a voice recognition parameter.

35. The secondary device of claim 31, wherein the secondary device and primary device communicate via an ad hoc wireless network.

36. The secondary device of claim 31:
(a) wherein the primary device is a control computer of a vehicle and the secondary device is a mobile device in proximity to the vehicle;
(b) wherein the primary device is a control computer of a building and the secondary device is a mobile device in proximity to the building; or
(c) wherein the primary device is a smartphone and the secondary device is at least one of a smartwatch, a pair of smartglasses, a mobile health monitor, or an article of smartclothing.

37. The secondary device of claim 31, wherein the threshold is indicative of a sufficient degree of authentication.

38. A method operational by a primary device for authentication of a user, comprising: obtaining at least one biometric parameter representative of the user of the primary device using a biometric parameter detector of the primary device; determining a primary authentication value representative of a degree of authentication of the user of the primary device based on the at least one biometric parameter, wherein the primary authentication value indicates a degree of match within a range of values between the biometric parameter and corresponding features of an authorized user of the primary device; authenticating the user of the primary device based on the primary authentication value by comparing the primary authentication value with a threshold; and sharing the primary authentication value with a secondary device to facilitate authentication of the user by the secondary device, wherein the primary device and secondary device communicate via an ad hoc wireless network.

39. A primary device, comprising: a biometric parameter detector configured to obtain at least one biometric parameter representative of a user of the primary device; a transmitter; and a processing circuit coupled to the biometric parameter detector and the transmitter, the processing circuit configured to determine a primary authentication value representative of a degree of authentication of the user of the primary device based on the at least one biometric parameter, wherein the primary authentication value indicates a degree of match within a range of values between the biometric parameter and corresponding features of an authorized user of the primary device, authenticate the user of the primary device based on the primary authentication value by comparing the primary authentication value with a threshold, and share the primary authentication value with a secondary device using the transmitter to facilitate authentication of the user by the secondary device, wherein the primary device and secondary device communicate via an ad hoc wireless network.

* * * * *